(12) United States Patent
Svendsen

(10) Patent No.: US 11,068,534 B1
(45) Date of Patent: Jul. 20, 2021

(54) DETERMINING IMAGES OF INTEREST BASED ON A GEOGRAPHICAL LOCATION

(71) Applicant: Ikorongo Technology, LLC, Chapel Hill, NC (US)

(72) Inventor: Hugh Blake Svendsen, Chapel Hill, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 51 days.

(21) Appl. No.: 16/537,763

(22) Filed: Aug. 12, 2019

Related U.S. Application Data

(63) Continuation of application No. 16/251,880, filed on Jan. 18, 2019, now Pat. No. 10,387,487.

(60) Provisional application No. 62/666,953, filed on May 4, 2018, provisional application No. 62/621,858, filed on Jan. 25, 2018.

(51) Int. Cl.
| | |
|---|---|
| *G06F 16/587* | (2019.01) |
| *G06F 16/535* | (2019.01) |
| *G06T 19/00* | (2011.01) |
| *H04W 4/021* | (2018.01) |
| *G06F 16/9535* | (2019.01) |
| *G06Q 50/00* | (2012.01) |

(52) U.S. Cl.
CPC .......... *G06F 16/587* (2019.01); *G06F 16/535* (2019.01); *G06F 16/9535* (2019.01); *G06T 19/006* (2013.01); *H04W 4/021* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,526,158 | B1 | 2/2003 | Goldberg |
| 6,591,068 | B1 | 7/2003 | Dietz |
| 6,819,783 | B2 | 11/2004 | Goldberg |
| 7,028,253 | B1 | 4/2006 | Lieberman et al. |
| 7,068,309 | B2 | 6/2006 | Toyama et al. |
| 7,107,605 | B2 | 9/2006 | Janik |
| 7,266,563 | B2 | 9/2007 | Morris et al. |
| 7,376,696 | B2 | 5/2008 | Bell |
| 7,426,532 | B2 | 9/2008 | Bell |
| 7,472,134 | B2 | 12/2008 | Kaku |

(Continued)

OTHER PUBLICATIONS

Rainio Karl, Presenting Historical Photos using Augmented Reality, VTT Technical Research Centre of Finland Ltd, 13 pages.

(Continued)

*Primary Examiner* — Brian Whipple

(57) ABSTRACT

Methods, systems, and devices are described for identifying images which may be of interest to a user based on their current geographic location. In some embodiments, a check is first performed to determine if the current geographic location is a location-of-interest. Images are searched that are in geographical proximity to the current geographic location of the user to identify images-of-interest. The images-of-interest may be designated in part based on actions taken by subjects having had interactions with the images. The user is notified based on the discovery of one or more images-of-interest. The one or more images-of-interest may be presented to the user through the use of map overlays and/or augmented reality techniques.

27 Claims, 34 Drawing Sheets

(56) References Cited

U.S. PATENT DOCUMENTS

| | | | |
|---|---|---|---|
| 7,561,723 B2 | 7/2009 | Goldberg | |
| 7,562,056 B2 * | 7/2009 | Ma | G06K 9/3233 706/20 |
| 7,730,036 B2 | 6/2010 | Blose | |
| 7,730,130 B2 | 6/2010 | Issa | |
| 7,739,304 B2 | 6/2010 | Naaman et al. | |
| 7,822,746 B2 | 10/2010 | Svendsen | |
| 7,933,972 B1 | 4/2011 | Issa et al. | |
| 7,953,690 B2 | 5/2011 | Luo | |
| 7,961,986 B1 | 6/2011 | Jing et al. | |
| 7,996,015 B2 | 8/2011 | Bloebaum | |
| 8,014,572 B2 | 9/2011 | Xiao et al. | |
| 8,060,525 B2 | 11/2011 | Svendsen et al. | |
| 8,144,944 B2 | 3/2012 | Ishii | |
| 8,185,139 B1 | 5/2012 | Mangal | |
| 8,204,437 B1 | 6/2012 | Rothschild | |
| 8,284,990 B2 | 10/2012 | Ma et al. | |
| 8,341,145 B2 | 12/2012 | Dodson et al. | |
| 8,402,094 B2 | 3/2013 | Bosworth et al. | |
| 8,437,797 B2 | 5/2013 | Rothschild | |
| 8,504,073 B2 | 8/2013 | Svendsen et al. | |
| 8,510,383 B2 | 8/2013 | Hurley et al. | |
| 8,543,454 B2 | 9/2013 | Fleischman et al. | |
| 8,581,997 B2 | 11/2013 | Lahcanski et al. | |
| 8,594,722 B2 | 11/2013 | Rothschild | |
| 8,612,533 B1 | 12/2013 | Harris et al. | |
| 8,630,494 B1 | 1/2014 | Svendsen | |
| 8,731,819 B2 | 5/2014 | Dzubay et al. | |
| 8,761,523 B2 | 6/2014 | Cok et al. | |
| 9,026,947 B2 | 5/2015 | Lee et al. | |
| 9,043,318 B2 | 5/2015 | Kim | |
| 9,097,554 B2 | 8/2015 | Choi | |
| 9,195,679 B1 | 11/2015 | Svendsen | |
| 9,210,313 B1 | 12/2015 | Svendsen | |
| 9,269,081 B1 | 2/2016 | Panzer | |
| 9,386,413 B2 | 7/2016 | Manber et al. | |
| 9,459,778 B2 | 10/2016 | Hogeg et al. | |
| 9,716,827 B2 | 7/2017 | Bostick et al. | |
| 9,727,312 B1 * | 8/2017 | Svendsen | H04N 7/183 |
| 10,334,158 B2 | 6/2019 | Gove | |
| 2002/0052674 A1 * | 5/2002 | Chang | G06F 16/9537 700/300 |
| 2002/0126150 A1 | 9/2002 | Parry | |
| 2003/0063770 A1 | 4/2003 | Svendsen et al. | |
| 2003/0063771 A1 | 4/2003 | Morris et al. | |
| 2003/0161499 A1 | 8/2003 | Svendsen | |
| 2004/0044723 A1 | 3/2004 | Bell | |
| 2004/0044724 A1 | 3/2004 | Bell | |
| 2004/0044725 A1 | 3/2004 | Bell | |
| 2005/0068227 A1 | 3/2005 | Caspi et al. | |
| 2005/0162711 A1 | 7/2005 | Wu | |
| 2005/0171955 A1 | 8/2005 | Hull | |
| 2006/0048059 A1 | 3/2006 | Etkin | |
| 2006/0161867 A1 | 3/2006 | Drucker | |
| 2006/0242238 A1 | 10/2006 | Issa | |
| 2006/0248573 A1 | 11/2006 | Pannu et al. | |
| 2007/0118525 A1 | 5/2007 | Svendsen | |
| 2008/0189766 A1 | 8/2008 | Bell et al. | |
| 2008/0279419 A1 | 11/2008 | Kluesing et al. | |
| 2008/0310688 A1 | 12/2008 | Goldberg | |
| 2009/0063995 A1 | 3/2009 | Baron et al. | |
| 2009/0144392 A1 | 6/2009 | Wang et al. | |
| 2009/0164516 A1 | 6/2009 | Svendsen et al. | |
| 2009/0199226 A1 | 8/2009 | Suehiro et al. | |
| 2009/0216806 A1 | 8/2009 | Feuerstein et al. | |
| 2009/0234815 A1 | 9/2009 | Boerries et al. | |
| 2009/0271247 A1 | 10/2009 | Karelin et al. | |
| 2009/0292549 A1 | 11/2009 | Ma et al. | |
| 2010/0036875 A1 | 2/2010 | Miezianko | |
| 2010/0103463 A1 | 4/2010 | Joshi | |
| 2010/0150407 A1 | 6/2010 | Cheswick | |
| 2010/0153848 A1 | 6/2010 | Saha | |
| 2010/0177938 A1 | 7/2010 | Martinez et al. | |
| 2010/0180218 A1 | 7/2010 | Boston et al. | |
| 2010/0185642 A1 | 7/2010 | Higgins et al. | |
| 2010/0191728 A1 | 7/2010 | Reilly | |
| 2011/0022529 A1 | 1/2011 | Barsoba | |
| 2011/0038512 A1 | 2/2011 | Petrou et al. | |
| 2011/0182485 A1 | 2/2011 | Shochat | |
| 2011/0083101 A1 | 4/2011 | Sharon et al. | |
| 2011/0087734 A1 | 4/2011 | Parsons et al. | |
| 2011/0107369 A1 | 5/2011 | OBrien et al. | |
| 2011/0145275 A1 | 6/2011 | Stewart | |
| 2011/0145719 A1 | 6/2011 | Chen et al. | |
| 2011/0182482 A1 | 7/2011 | Winters et al. | |
| 2011/0188742 A1 | 8/2011 | Yu et al. | |
| 2011/0211736 A1 | 9/2011 | Krupka et al. | |
| 2011/0211737 A1 | 9/2011 | Krupka et al. | |
| 2011/0268323 A1 | 11/2011 | Gallagher | |
| 2012/0052871 A1 * | 3/2012 | Cochran | G06Q 30/0201 455/456.1 |
| 2012/0076367 A1 | 3/2012 | Tseng | |
| 2012/0158753 A1 | 6/2012 | He et al. | |
| 2012/0166533 A1 | 6/2012 | Rubinstein et al. | |
| 2012/0221687 A1 | 8/2012 | Hunter et al. | |
| 2012/0250950 A1 | 10/2012 | Papakipos et al. | |
| 2012/0250951 A1 | 10/2012 | Chen | |
| 2012/0265758 A1 | 10/2012 | Han et al. | |
| 2012/0271790 A1 | 10/2012 | Lappas et al. | |
| 2012/0275666 A1 | 11/2012 | Gao | |
| 2012/0310968 A1 | 12/2012 | Tseng | |
| 2013/0035114 A1 | 2/2013 | Holden et al. | |
| 2013/0162665 A1 | 6/2013 | Lynch | |
| 2013/0275505 A1 | 10/2013 | Gauglitz et al. | |
| 2013/0290439 A1 | 10/2013 | Blom | |
| 2013/0330007 A1 | 12/2013 | Kim et al. | |
| 2013/0330019 A1 | 12/2013 | Kim et al. | |
| 2013/0339440 A1 | 12/2013 | Balassanian et al. | |
| 2014/0032596 A1 * | 1/2014 | Fish | G06F 16/58 707/770 |
| 2014/0067943 A1 | 3/2014 | Jackson et al. | |
| 2014/0214843 A1 | 7/2014 | Arvig | |
| 2015/0055854 A1 * | 2/2015 | Marchesotti | G06F 16/50 382/159 |
| 2015/0172393 A1 | 6/2015 | Oplinger et al. | |
| 2015/0362988 A1 * | 12/2015 | Yamamoto | G06F 3/011 345/156 |
| 2016/0019413 A1 | 1/2016 | Svendsen | |
| 2016/0359987 A1 | 12/2016 | Laliberte | |
| 2017/0070358 A1 | 3/2017 | Svendsen | |
| 2017/0124713 A1 | 5/2017 | Jurgenson et al. | |
| 2017/0195842 A1 * | 7/2017 | Brady, Jr. | G01C 21/32 |

OTHER PUBLICATIONS

Erickson, on Location: Socio-locative Broadcasting As Situated Rhetorical Action, Stanford University Dissertations & Theses 3343578, 2008, 151 pages, ISBN 9780549986065, ProQuest UMI Dissertations Publishing 2008, Ann Arbor, U.S.

Facebook Moments Help Center, Facebook, Jan. 7, 2017, 7 pages.

Molly McHugh, Facebook Moments Is a Smarter Photo App—Much Smarter, Wired, Jun. 16, 2015, 9 pages.

Google Photos Explained: Should Everyone Switch to It?, guidingtech.com, Jan. 7, 2017, 9 pages.

Tim Moynihan, Google Photos Is Your New Essential Picture App, WIRED, May 29, 2015, 10 pages.

OS—Photos—Apple, Apple Inc., Jan. 7, 2017, 10 pages.

\* cited by examiner

SYSTEM DIAGRAM

PROMOTIONS REPOSITORY ⟵ 280

| PROMOTIONS REPOSITORY 280 |
| --- |
| PROMOTION ITEM 281 [0-N] |
| PROMOTION ID 282 |
| PROMOTION GEOGRAPHICAL AREA 283 |
| PROMOTION WEIGHT 284 |

FIG. 1G

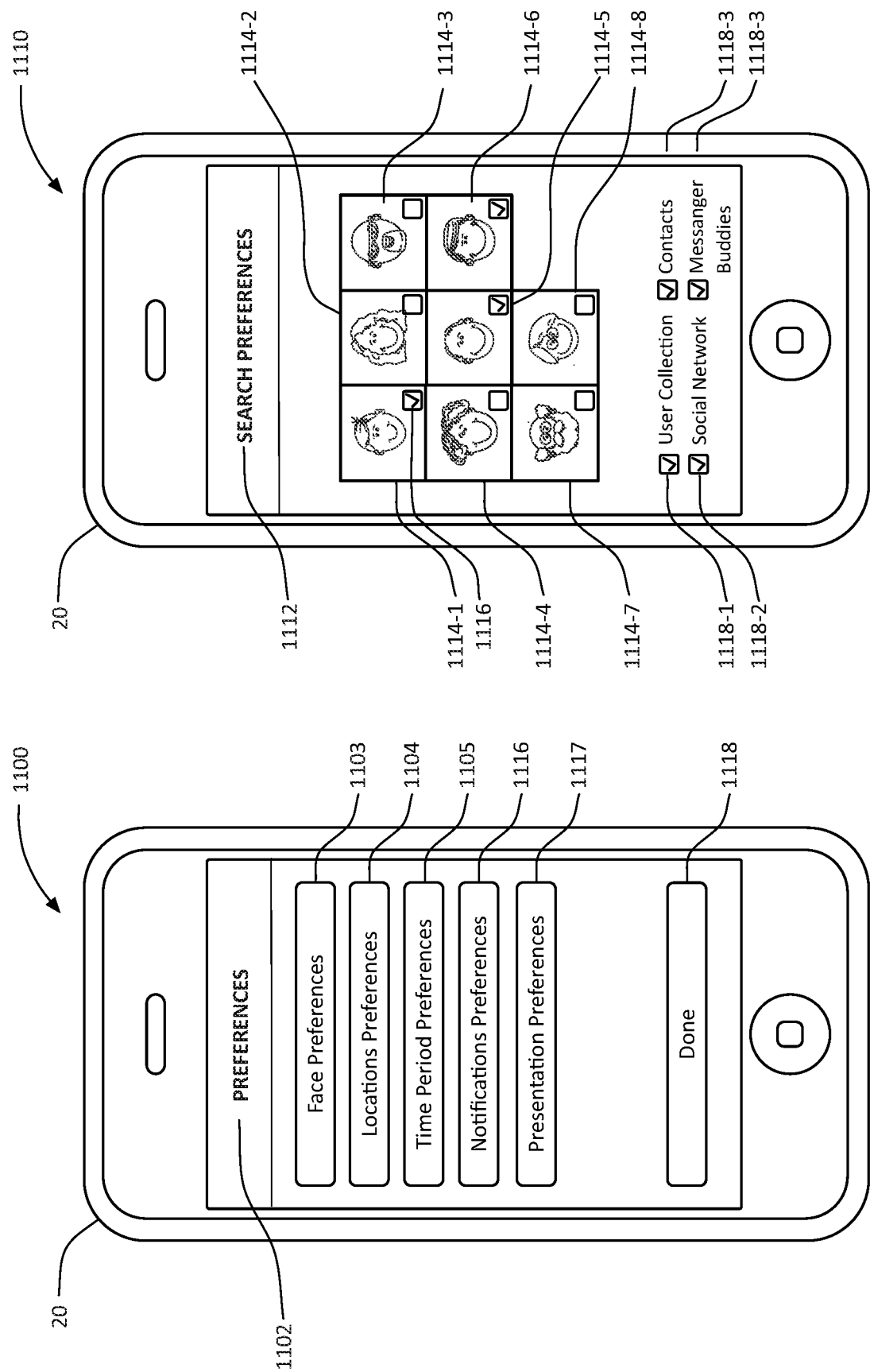

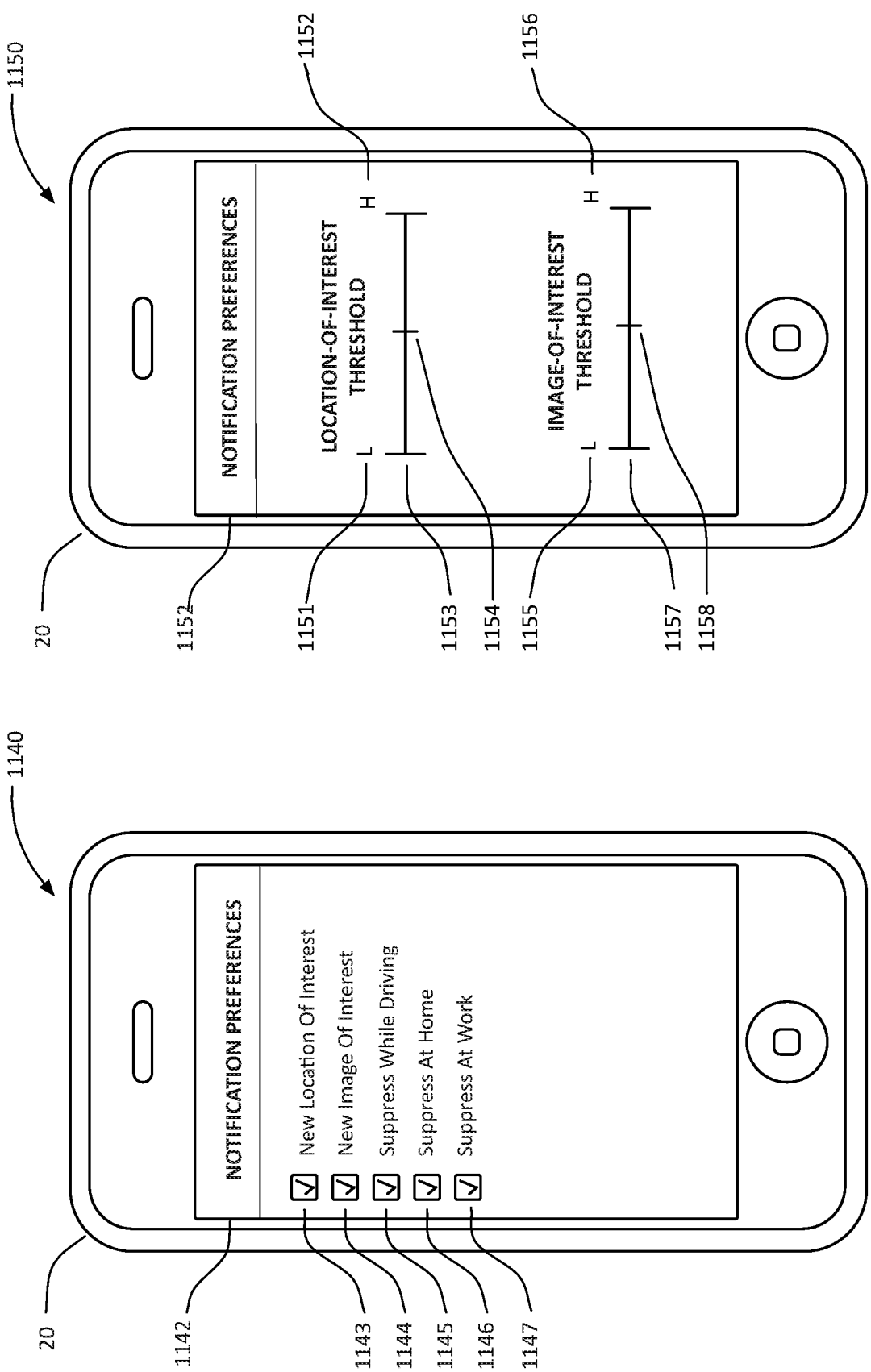

DETERMINING IMAGES OF INTEREST BASED ON A GEOGRAPHICAL LOCATION

RELATED CASES

This application claims the benefit of U.S. patent application Ser. No. 16/251,880 filed on Jan. 18, 2019, U.S. Provisional Patent Application No. 62/666,953 filed on May 4, 2018 and U.S. Provisional Patent Application No. 62/621,858 filed on Jan. 25, 2018, the disclosures of which are incorporated herein by reference in their entirety.

TECHNICAL FIELD

The present disclosure relates to identifying images-of-interest and viewing the images-of-interest using an augmented reality environment.

BACKGROUND

Many millions of images are captured every day, predominately by cell phones. Today's cell phones include a number of sophisticated sensors, and much of the data collected by those sensors may be stored with the captured images. Metadata stored with the captured images may include the geographical capture location, direction of camera, focal distance, etc. Advances in facial recognition have made it easier than ever before to accurately tag large numbers of images with the persons appearing in the images. At the same time, advances in augmented reality (AR) and 3D visualization have made it possible to put together compelling mobile user experiences employing these technologies, as evidenced by the recent popularity of applications like Pokémon Go®. Untapped opportunities exist for marrying the advantages of sensor rich cell phones, images incorporating rich metadata, and navigational possibilities of AR and 3D.

SUMMARY OF THE DISCLOSURE

The present disclosure details a system whereby a mobile device user may be alerted when they arrive at a new geographical area where images have been captured in geographical proximity in the past including faces of subjects (people) that may be known or of interest. Subject faces of interest may be determined by examining the social graph of the user and/or examining the images stored on the cell phone of the user. Once an image has been designated, a notification may be provided to the cell phone user. Upon selecting the notification, the user may be presented with a three-dimensional map showing the current location of the user and the location of the designated image. As the user moves around and changes geographical position, the map updates, and the perspective on the captured image us updated.

A system is described wherein a new geographical location is received as input at the mobile device, typically in GPS coordinate form. Based on these input coordinates, an interest area surrounding the point is determined. The area may take the form of a circle, square, indeed any arbitrary shape. The interest area is then examined to determine if images exist that would be relevant to the user of the mobile device. In some embodiments, relevant images may be those images containing overlapping subject faces with the images stored on the mobile device. In some embodiments, relevant images may be those images including social networking friends of the user of the mobile device. If relevant images are identified, the process continues, otherwise it aborts. Next, exclusion areas are retrieved, and the interest area is examined to determine if there is overlap between the interest area and at least one of the exclusion areas. If overlap is found then the process aborts, otherwise the process continues. Next, exclusion scenarios are retrieved, and the interest area is examined to determine if there is overlap between the current environment and at least one of the exclusion scenarios. If overlap is found then the process aborts, otherwise the process continues. Exclusion scenarios may take the form of a time window. For example, don't provide notification from 11 PM to 6 AM. Exclusion scenarios may take the form of an activity, for example, don't provide notification when the user is talking on the phone and/or driving. Exclusion scenarios may take the form of locations. Don't send me notification while at work.

It is a goal of the present disclosure to improve the technology employed by the various components and devices comprising the system, thereby improving the functionality of the composite system. These improvements in technology are expected to improve the functionality available to users of the system as well, indeed it is a primary motivation behind improving the technology. Improvements to the components and devices comprising the system and improvements in functionality available to users should not be considered mutually exclusive.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a server device comprising a communications interface operable to: couple the server device to a plurality of mobile devices, the plurality of mobile devices including a first mobile device associated with a first user account of a first user and a plurality of other mobile devices associated with other user accounts of a plurality of other users; and a processor and memory coupled to the communications interface and operable to: identify a current geographic location of the first mobile device of the plurality of mobile devices as a location-of-interest; identify an image in geographical proximity to the location-of-interest as an image-of-interest based on a first user profile of the first user account; and send, to the first mobile device of the plurality of mobile devices, first information identifying the image-of-interest. Other embodiments of this aspect include corresponding computer systems, apparatus, and computer programs recorded on one or more computer storage devices, each configured to perform the actions of the methods.

Implementations may include one or more of the following features. The server device may be further operable to: identify the image in the geographical proximity to the location-of-interest as the image-of-interest in response to identifying the current geographic location of the first mobile device of the plurality of mobile devices as the location-of-interest; and send, to the first mobile device of the plurality of mobile devices, the first information identifying the image-of-interest in response to identifying the image in the geographical proximity to the location-of-interest as the image-of-interest. The server device may be further operable to: retrieve a plurality of images from a first image collection linked to the first user account; retrieve social graph information for the first user account; and analyze the plurality of images from the first image collection and the social graph information to determine subject affinities between the first user of the first mobile device and other users of other mobile devices. The server device may be further operable to: analyze symmetric social network connections between the first user and ones of other users; analyze asymmetric social network connections between the first user and ones of other users; analyze occurrences of subject faces of the plurality of other users appearing in images in a first user's collection; and analyze co-occurrences of a subject face of the first user of the first mobile device and other subject faces of the plurality of other users of the other mobile devices occurring in the first user's collection. The server device may be further operable to: collect geographic location data for the first mobile device on a periodic basis; store the geographic location data in a tracking database; and determine a home location using the geographic location data. The server device may be further operable to: determine a location affinity score; and based on the location affinity score, determine if the current geographic location is the location-of-interest. The server device may be further operable to: determine a distance between the current geographical location and a home geographical location; determine a number of days since the current geographical location was visited; determine a total number of times that the current geographical location was visited; and determine the location affinity score based on the distance between the current geographical location and the home geographical location, the number of days since the current geographical location was visited, and the total number of times that the current geographical location was visited. The server device may be further operable to: compute the location affinity score to be proportional to the distance between the current geographical location and the home geographical location a last time that the current geographical location was visited and inversely proportional to the total number of times that the current geographical location was visited. The server device may be further operable to: modify the location affinity score based on an exclusion bias applied to the current location, wherein the exclusion bias is determined from taking the sum of one or more geographic shapes in which the current location falls, each shape specified on behalf of a user based on the user's profile; and modify the location affinity score based on a promotional bias applied to the current location, wherein the promotional bias is determined from taking the sum of one or more geographic shapes in which the current location falls, each geographic shape specified by an advertiser and assigned a value based on the remuneration received from an advertiser. The server device may be further operable to: perform a comparison of the location affinity score to a location threshold value; and based on the comparison, determine that the image is the image-of-interest. The server device may be further operable to: designate a search area based on the location-of-interest; and identify the image as having been captured within the search area surrounding the location-of-interest as the image-of-interest. The size of the search area may be designated based on a speed of travel of the first mobile device as measured over a time interval. The shape of the search area may be designated based on a direction of travel of the first mobile device as measured over a time interval. The size of the search area may be designated based on an altitude of travel of the first mobile device as measured over a time interval. The server device may be further operable to: determine an image affinity score; and based on the image affinity score, determine if the image is the image-of-interest. The server device may be further operable to: determine subjects associated with the image by identifying: a first other user having captured the image; one or more second other users appearing as subject faces in the image; and one or more third other users contributing comments to the image; and determine action weights by: designating a first action weight for the one or more second other users appearing as the subject faces in the image; designating a second action weight for the one or more third other users contributing comments to the image; and designating a third action weight for the one or more third other users contributing comments to the image; and compute the image affinity score by: determining a first partial score based on a subject affinity of the first other user and the first action weight; determining a second partial score based on subject affinities of the one or more second other users and the second action weight; and determining a third partial score based on subject affinities of the one or more third other users and the third action weight; and determining the image affinity score based on the first partial score, the second partial score, and the third partial score. The server device may be further operable to: scale the subject affinities of the one or more second other users appearing as subject faces in the image based on a size of a subject face in relation to dimensions of the image and a location of the subject face within the image. The server device may be further operable to: determine a distance between the current geographical location and a capture location of the image; and modify the image affinity score based on the distance. The server device may be further operable to: modify the image affinity score based on an exclusion bias applied to the capture location of the image, wherein the exclusion bias is determined from taking the sum of one or more geographic shapes in which the capture location of the image falls, each shape specified on behalf of a user based on the user's profile; and modify the image affinity score based on a promotional bias applied to the capture location of the image, wherein the promotional bias is determined from taking the sum of one or more geographic shapes in which the capture location of the image falls, each geographic shape specified by an advertiser and assigned a value based on the remuneration received from an advertiser. The server device may be further operable to: compute the image affinity score for the image to be: proportional to the subject affinity score; and inversely proportional to a distance between current a geographical location and a capture location. The server device may be further operable to: perform a comparison of the image affinity score to an image threshold value; and based on the comparison, determine that the image is the image-of-interest. The server device may be further operable to: receive, from the first mobile device of the plurality of mobile devices, second information identifying user interactions with the image-of-interest at the first mobile device; and adjust the parameter weights of subject affinity sources and subject actions based on the second information identifying the user interactions. The server device may be further operable to: send promotional information associated with the image to the first mobile device, the promotional information including one or more adornments configured for presentation with the image. The server device may be further operable to: receive, from the first mobile device, user interaction feedback, the user interaction feedback including: time difference between user receive a notification of the image, time spent by a user interacting with the image, comments added, likes applied, and dislikes applied. The server device may be further operable to: receive, from the plurality of other mobile devices associated with other user accounts of the plurality of other users, a plurality of other images; and identify, from the plurality of other images, the image-of-interest. The image-of-interest may be one of one or more images-of-interest and the location-of-interest may be one of one or more locations-of-interest. Implementations of the described techniques may include hardware, a method or process, or computer software on a computer-accessible medium.

In another general aspect a method of operating a server device is disclosed comprising: identifying an image, in geographical proximity to a current geographic location of a mobile device of a plurality of mobile devices, as an image-of-interest based on a user profile of a user account of a user of the mobile device; and sending, to the mobile device of the plurality of mobile devices, information identifying the image-of-interest. Other embodiments of this aspect include corresponding computer systems, apparatus, and computer programs recorded on one or more computer storage devices, each configured to perform the actions of the methods.

Implementations may include one or more of the following features. The image may be identified without determining that the current geographic location is a location-of-interest. The image may be identified after determining that the current geographic location is a location-of-interest.

In another general aspect a method of operating a server device is disclosed comprising: receiving a target geographic location from a device; identifying an image in geographical proximity to the target geographic location as an image-of-interest; and sending, to the device, information identifying the image-of-interest. Other embodiments of this aspect include corresponding computer systems, apparatus, and computer programs recorded on one or more computer storage devices, each configured to perform the actions of the methods.

Implementations may include one or more of the following features. The image may be identified without determining that the target geographic location is a location-of-interest. The target geographic location may be one of a current geographic location the and not the current geographic location of the device. The device may be one of a mobile device and a non-mobile device. The server device may further comprise: receiving, from the device, a distance value defining the geographical proximity. The distance value defining the geographical proximity may be determined based on bounds of a map to be shown on the device.

In another general aspect a method of operating a server device is disclosed comprising: receiving a target geographic area from a device; identifying an image within the target geographic area as an image-of-interest; and sending, to the device, information identifying the image-of-interest. Other embodiments of this aspect include corresponding computer systems, apparatus, and computer programs recorded on one or more computer storage devices, each configured to perform the actions of the methods.

Implementations may include one or more of the following features. The image may be identified without determining that the target geographic area includes a location-of-interest. The target geographic area may be one of including a current geographic location and not including the current geographic location of the device. The device may be one of a mobile device and a non-mobile device. The target geographic area may be determined based on bounds of a map to be shown on the device.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1G illustrates an exemplary data structure for a promotions repository according to some embodiments;

Figure 11D:
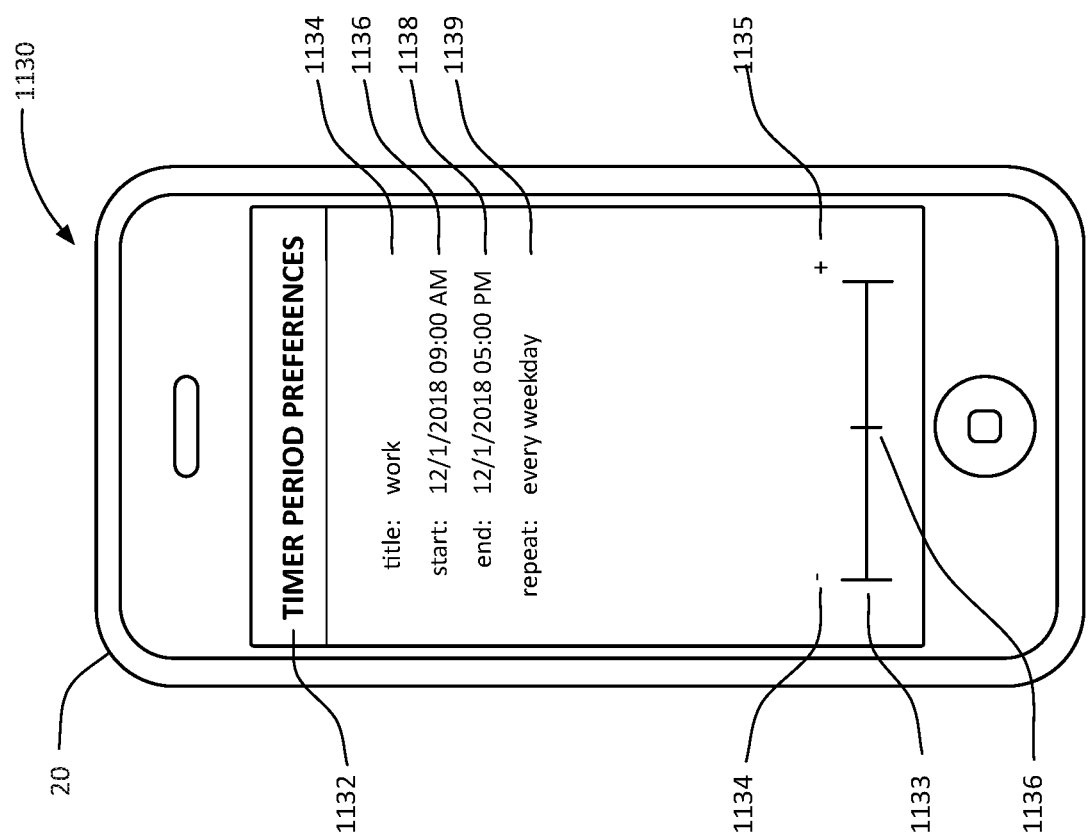
Figure 11C:
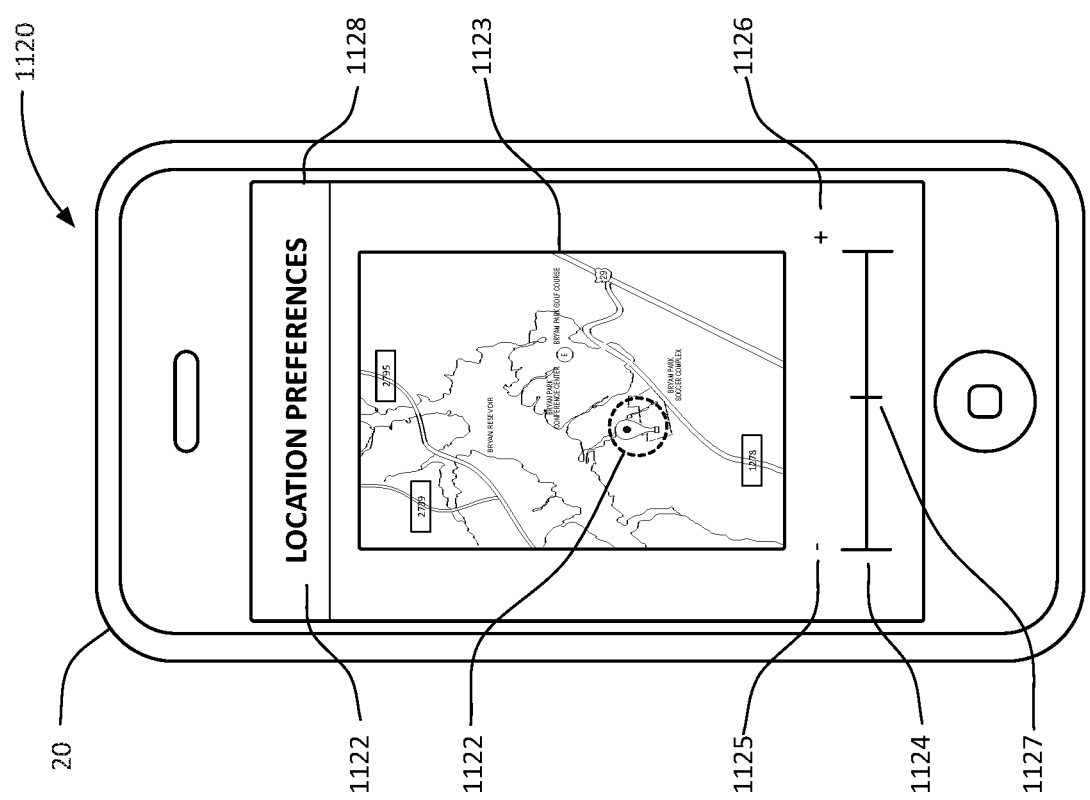
Figure 11H:
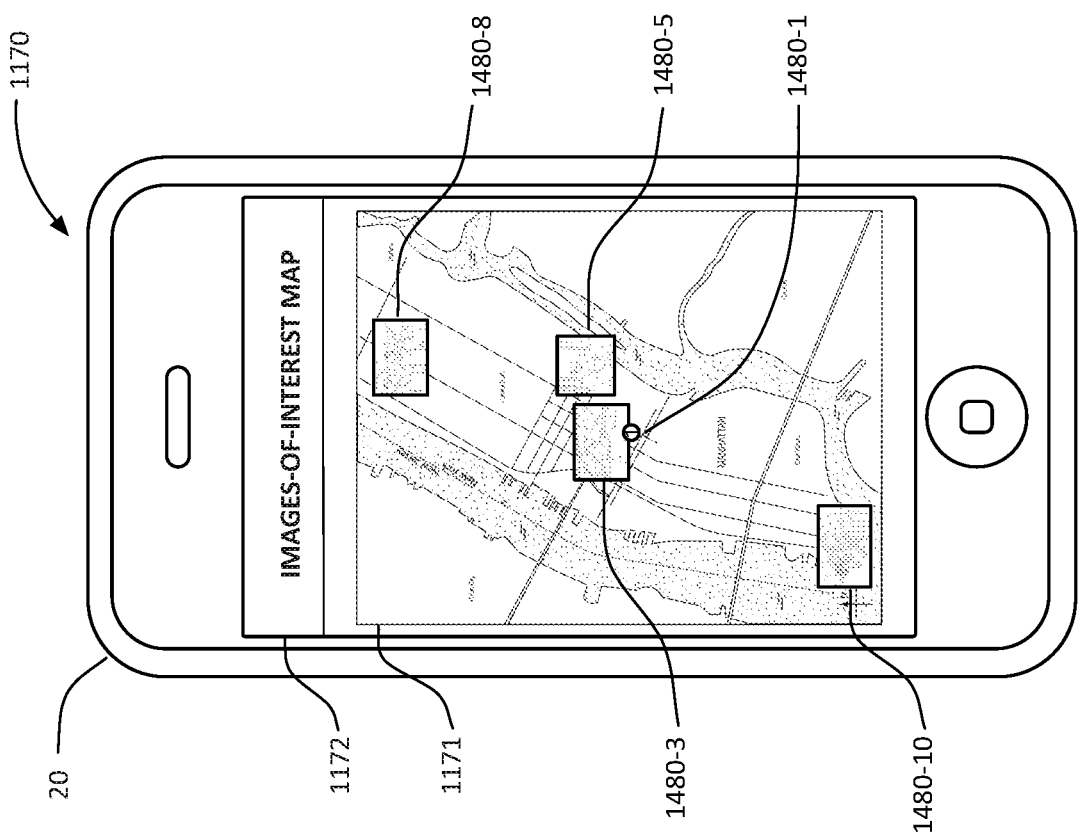
Figure 11G:
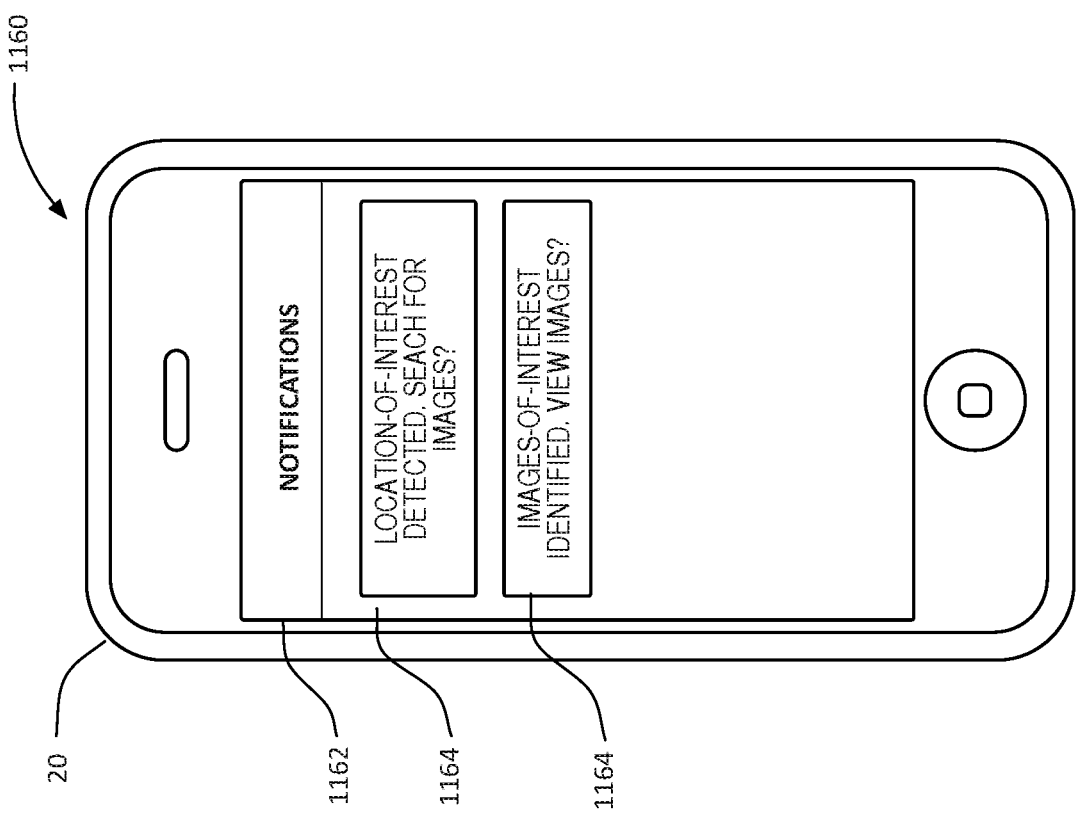
Figure 12A:
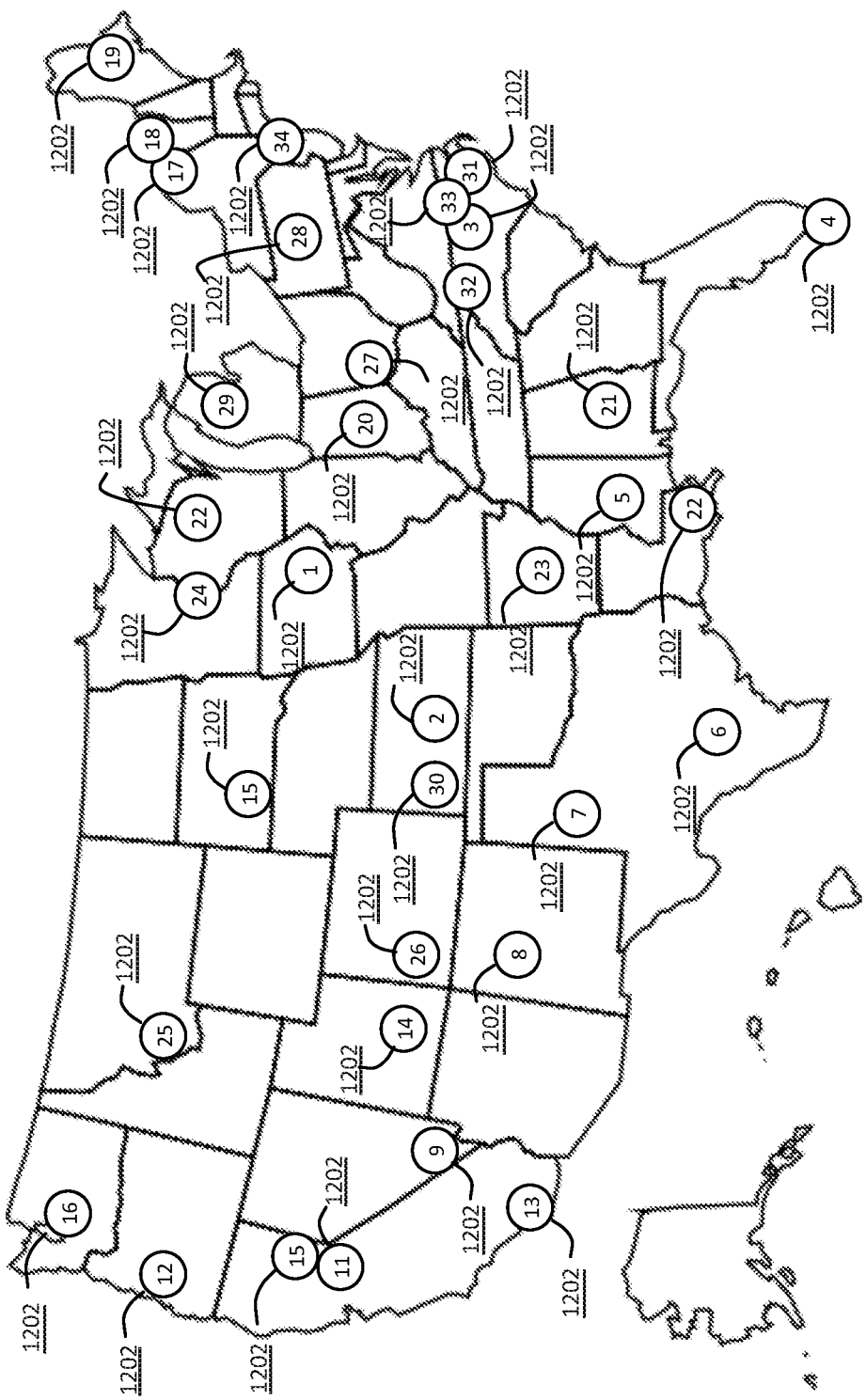
Figure 12B:
Figure 13A:
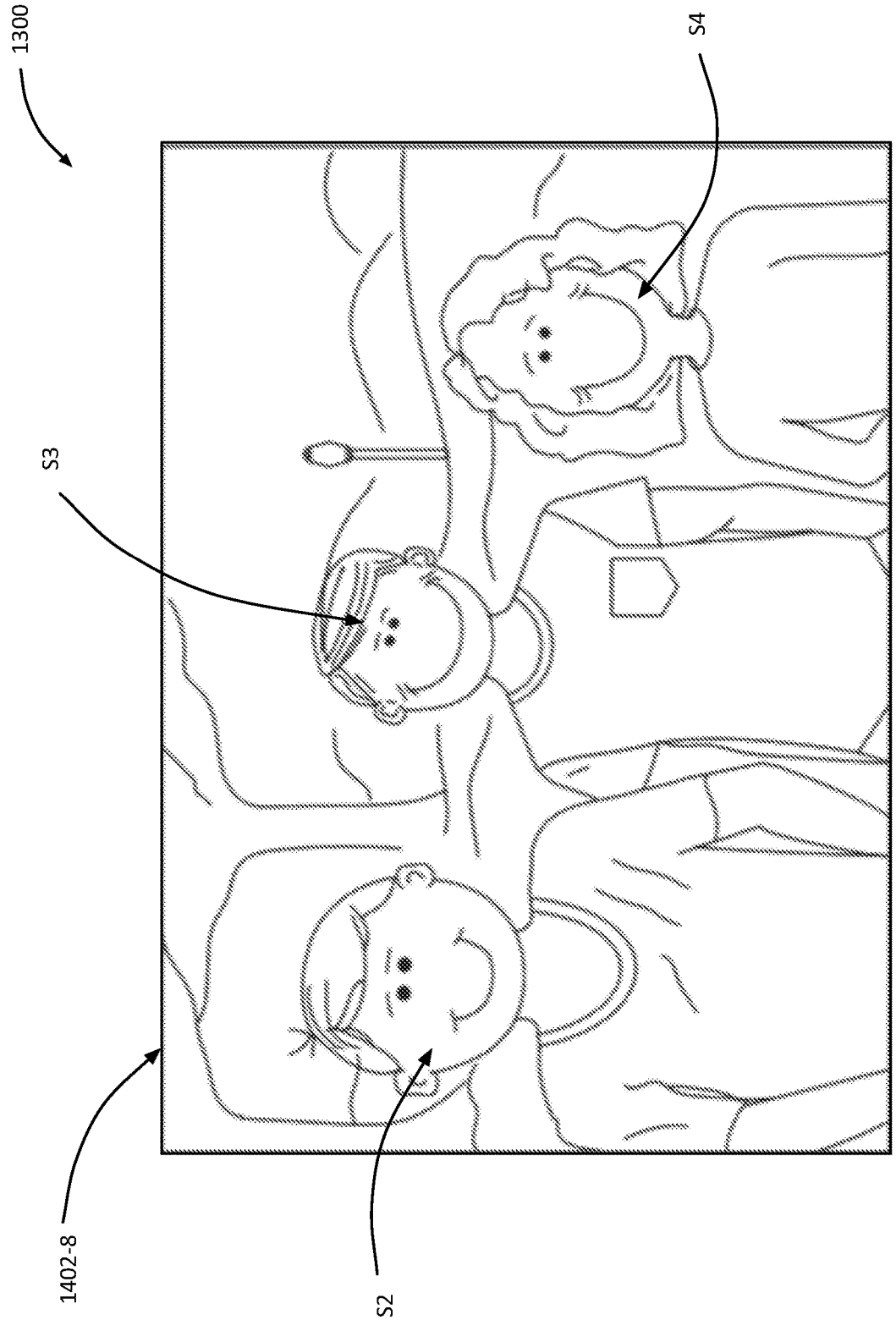
Figure 13B:
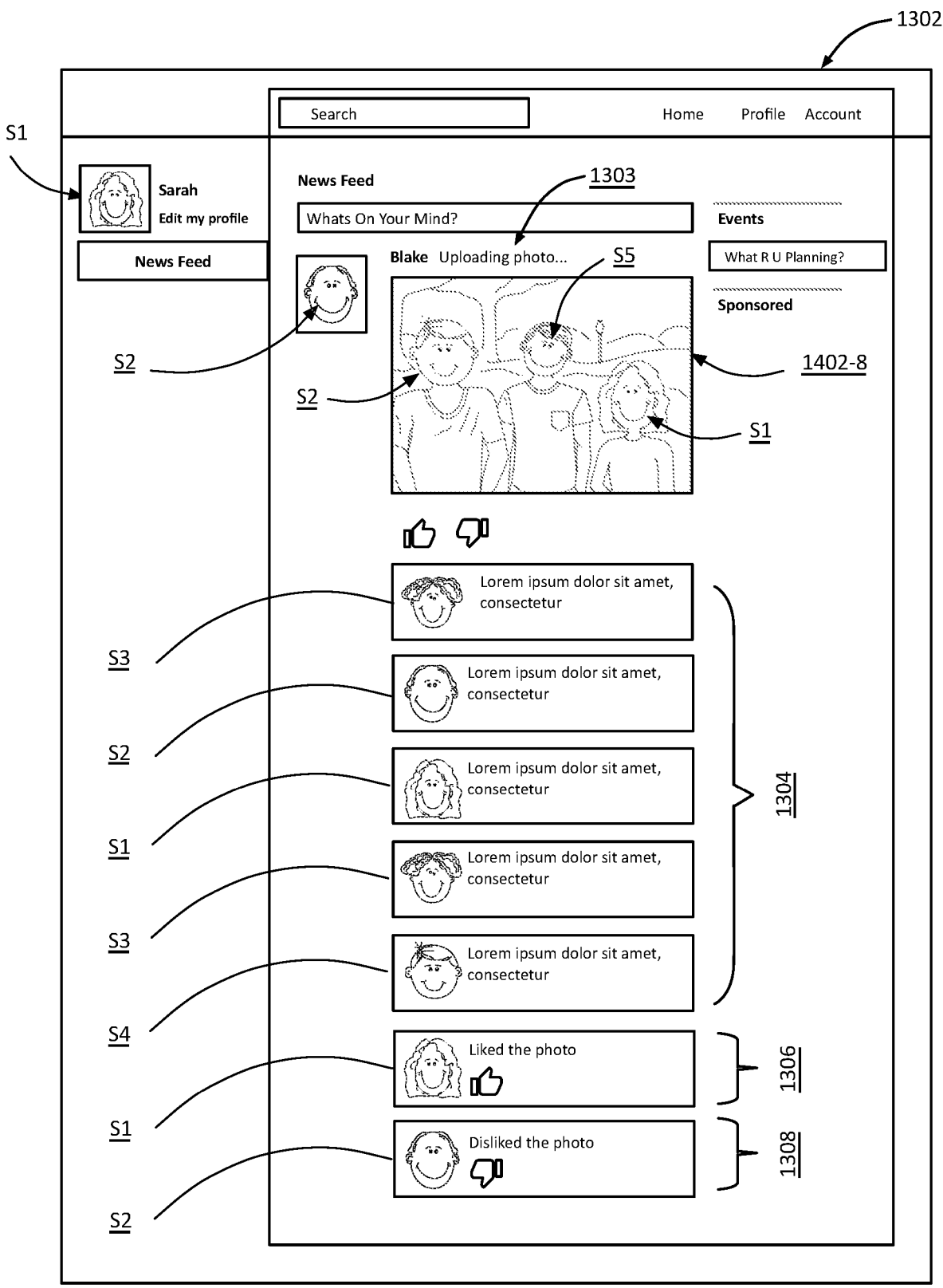
Figure 13C:
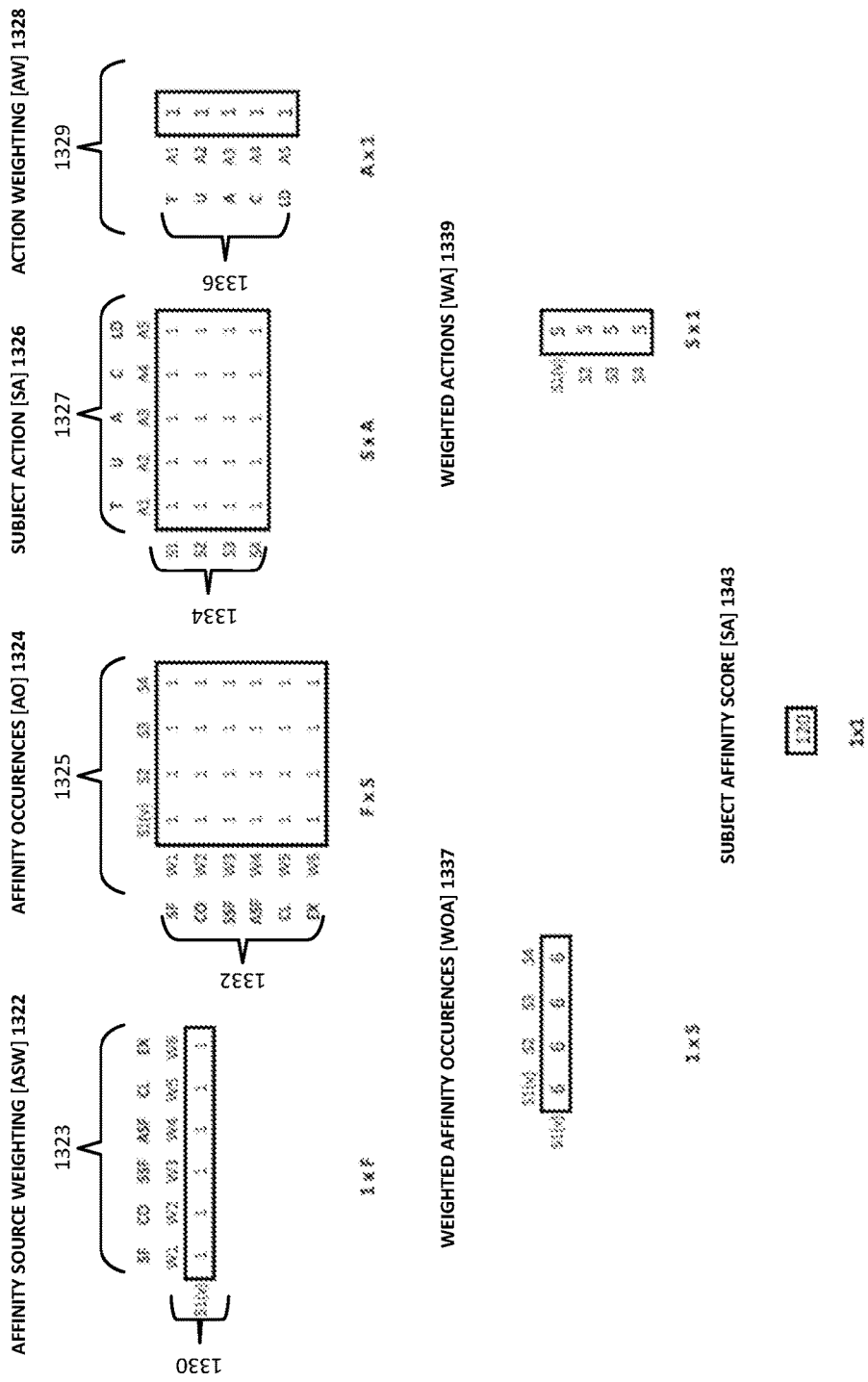
Figure 13D:
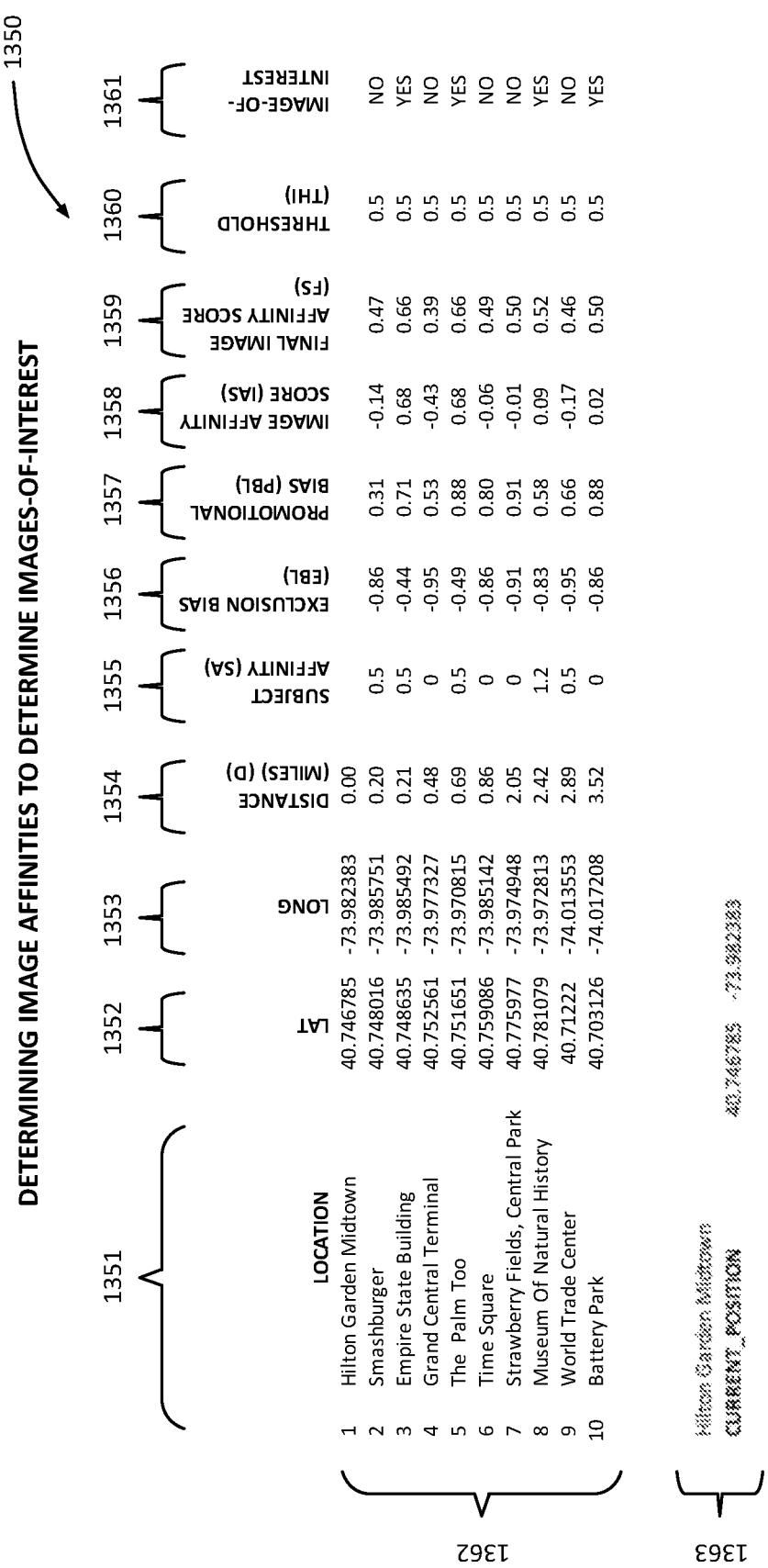
Figure 13E:
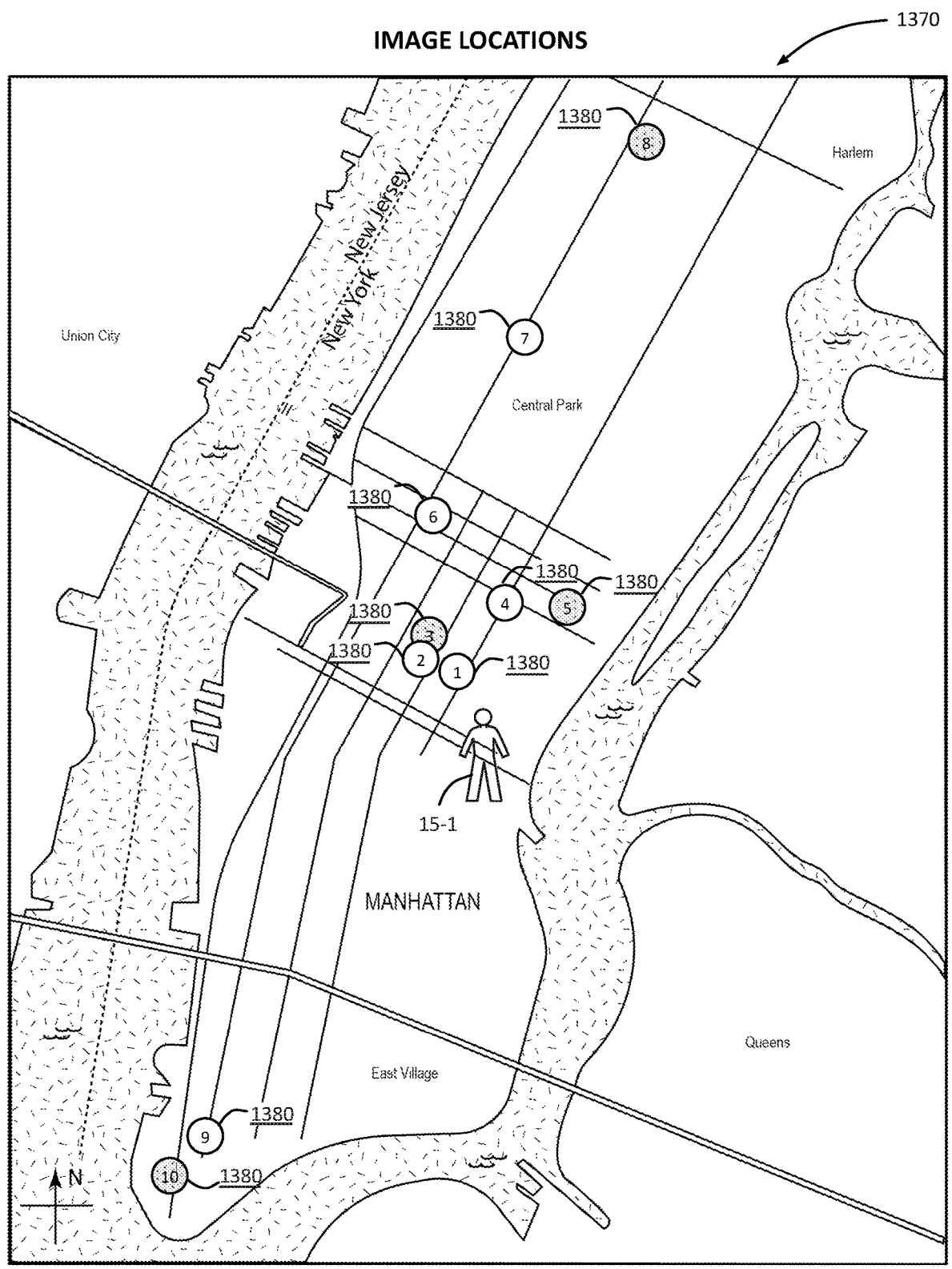
Figure 13F:
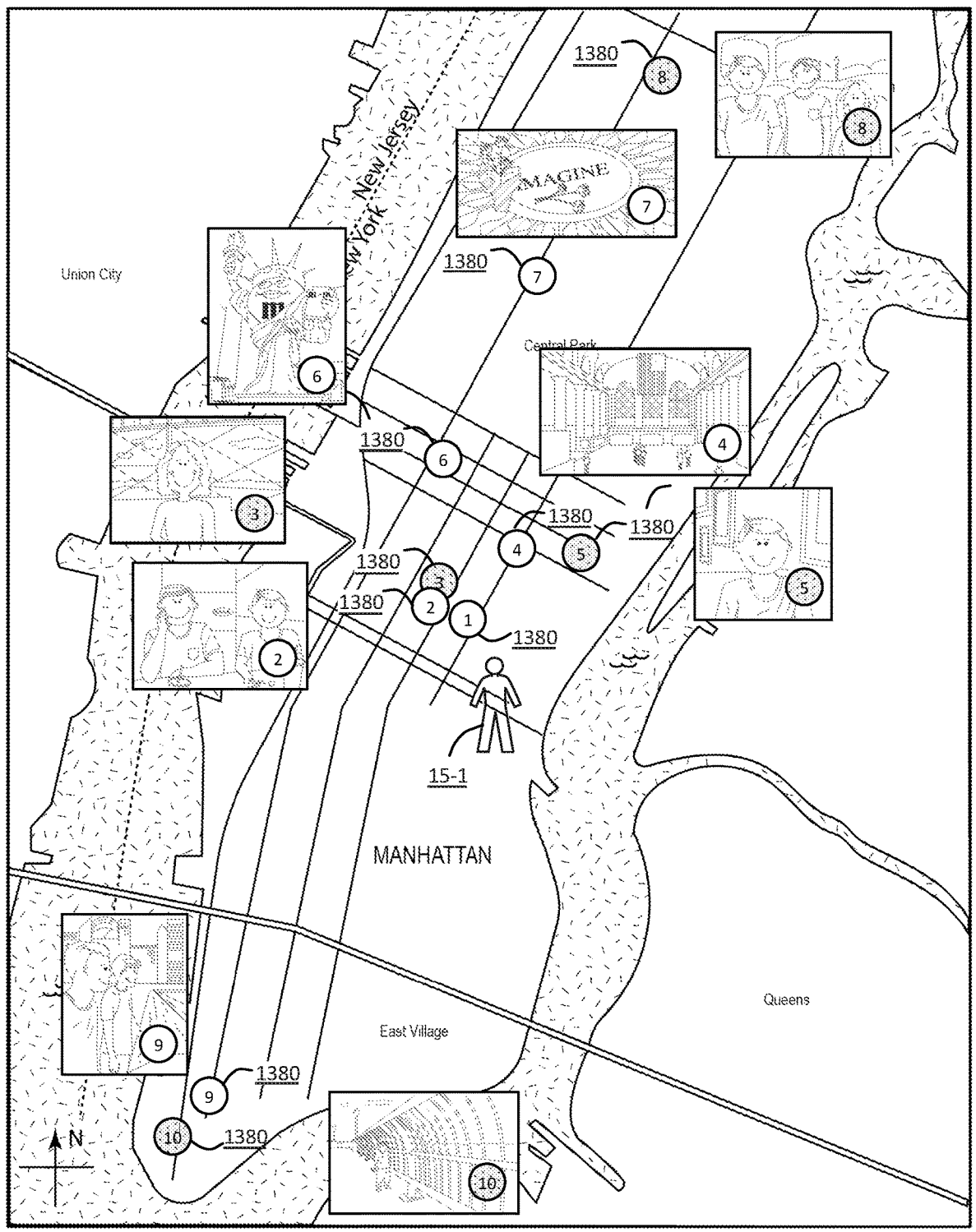
Figure 13G:
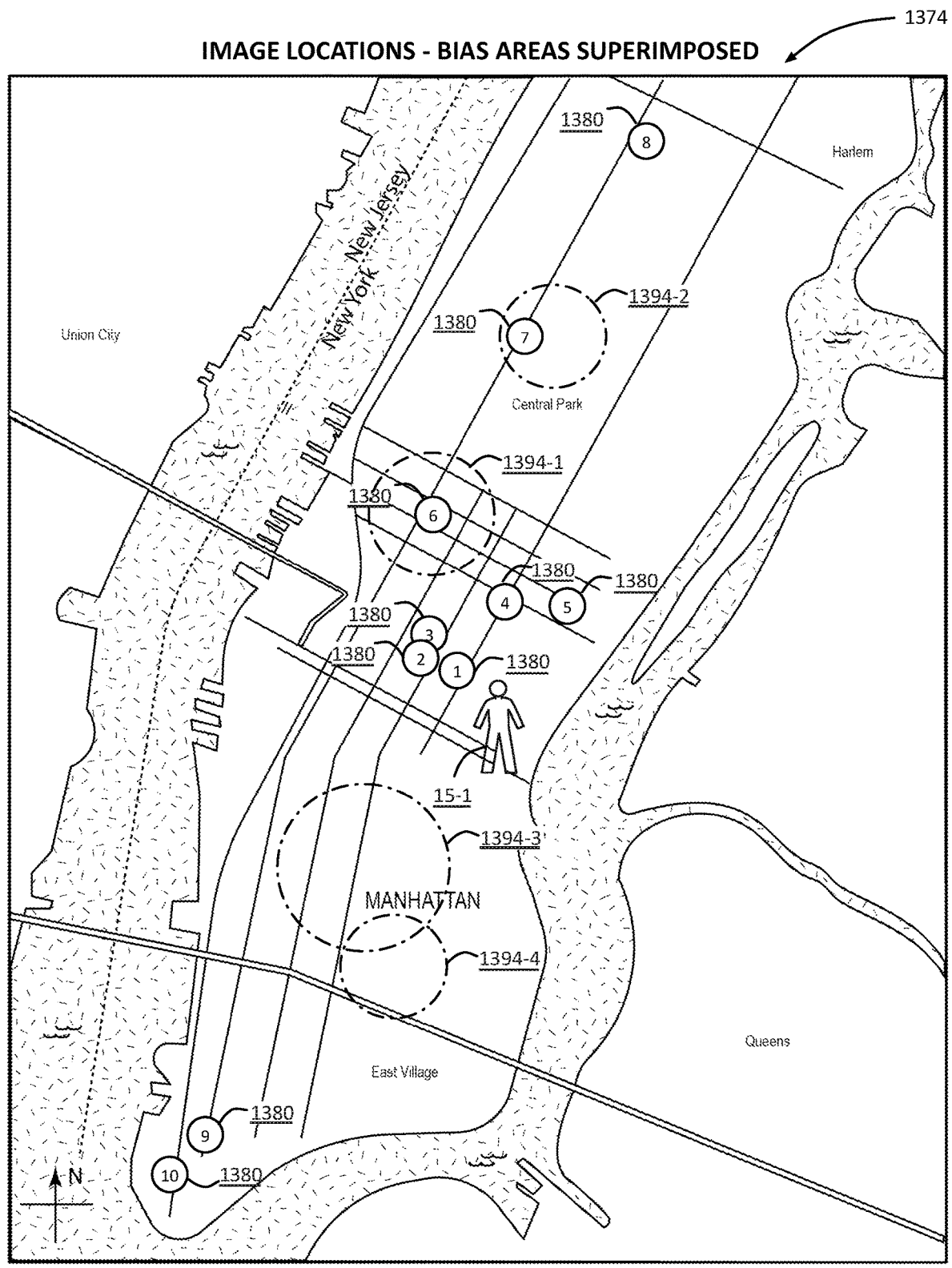
Figure 14:
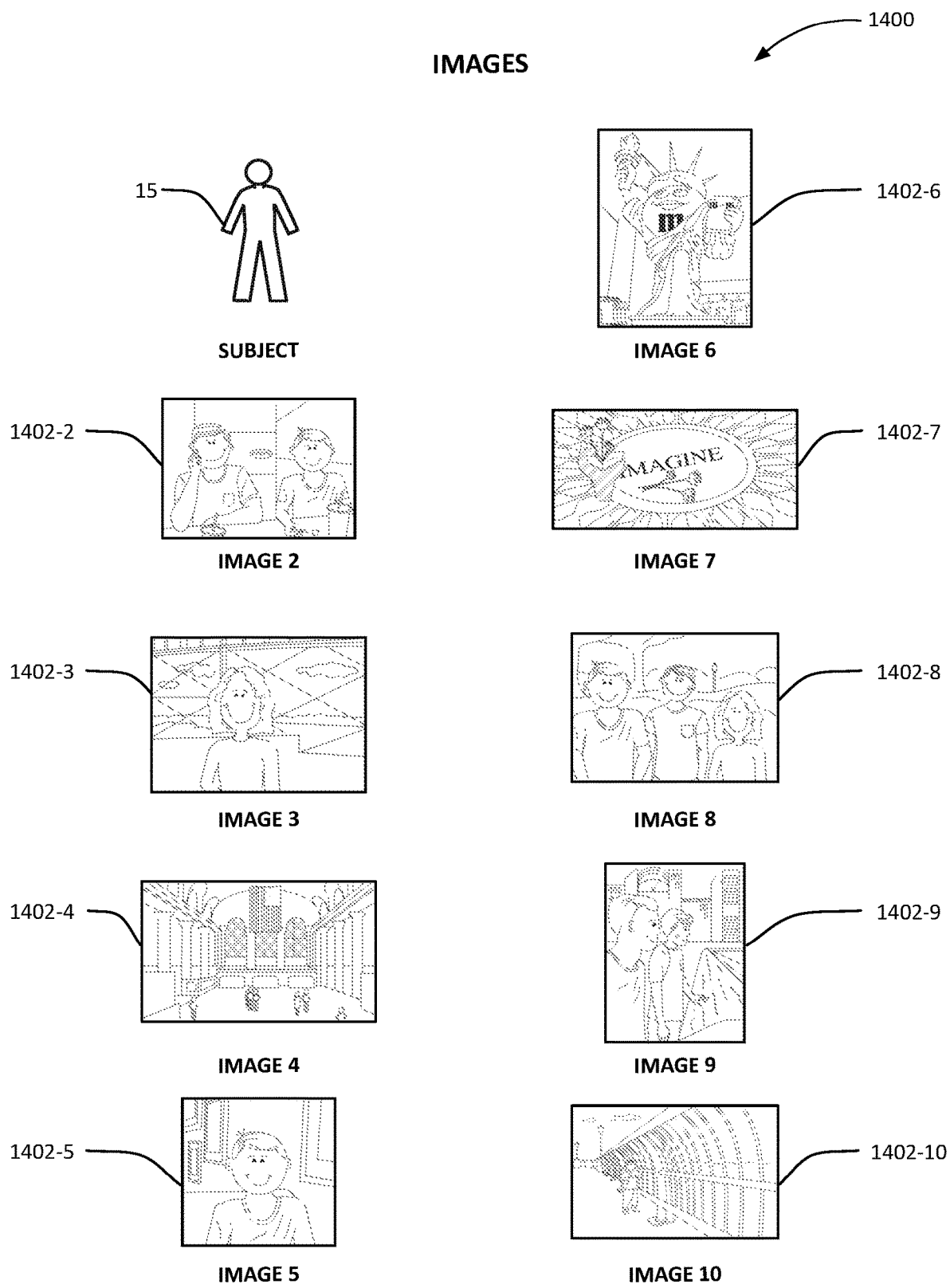
Figure 15:
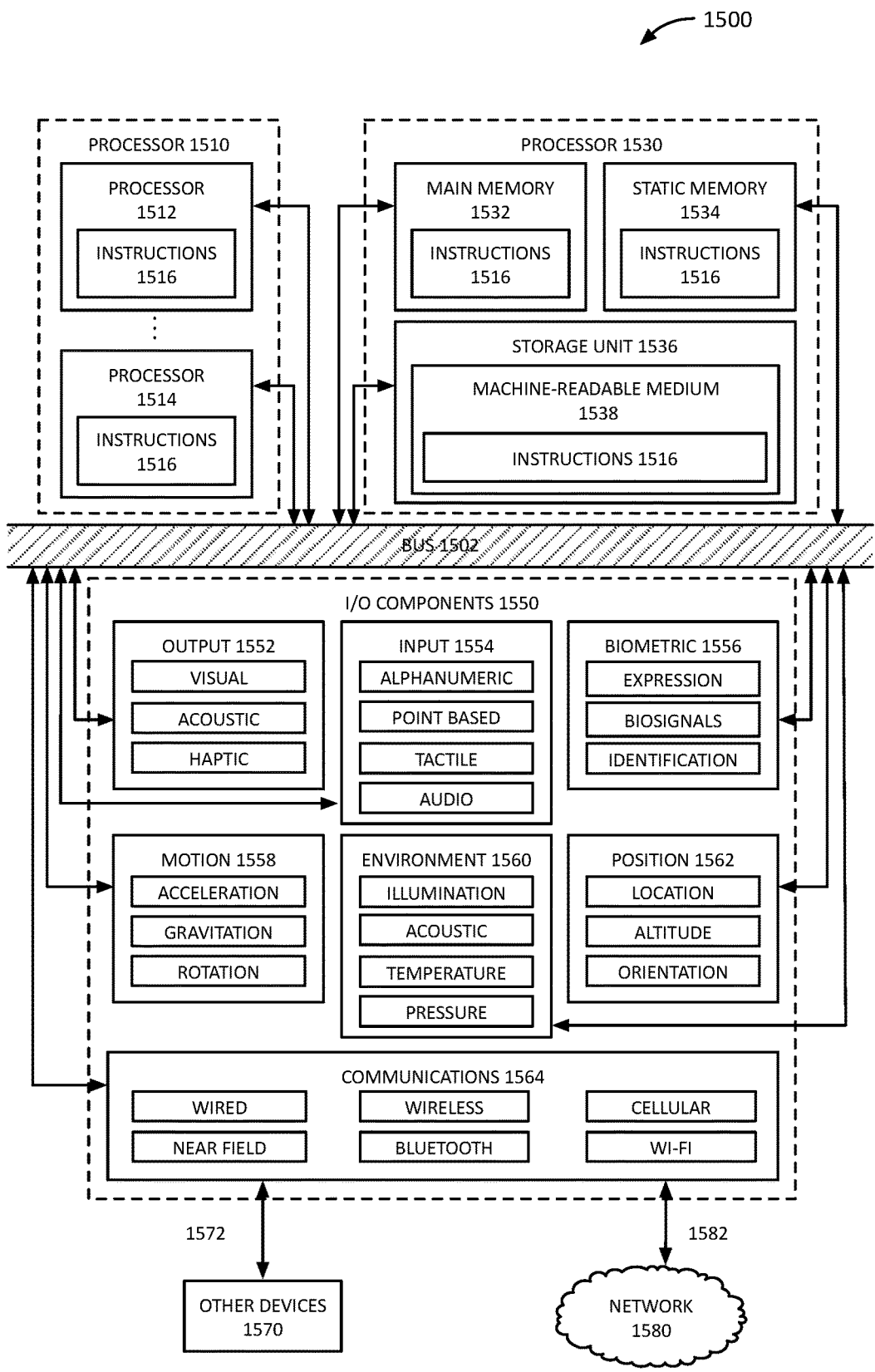
Figure 16:
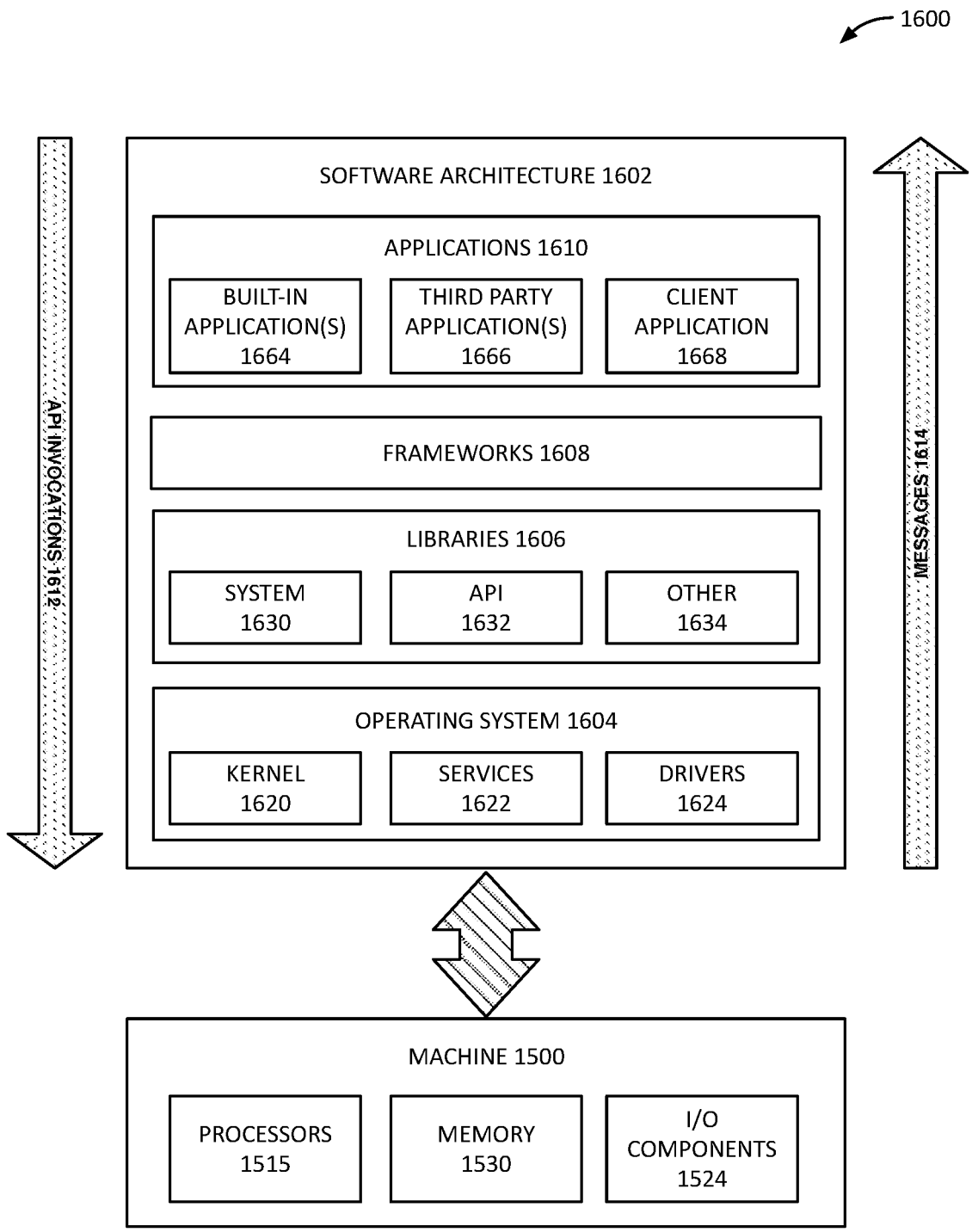
Figure 17:
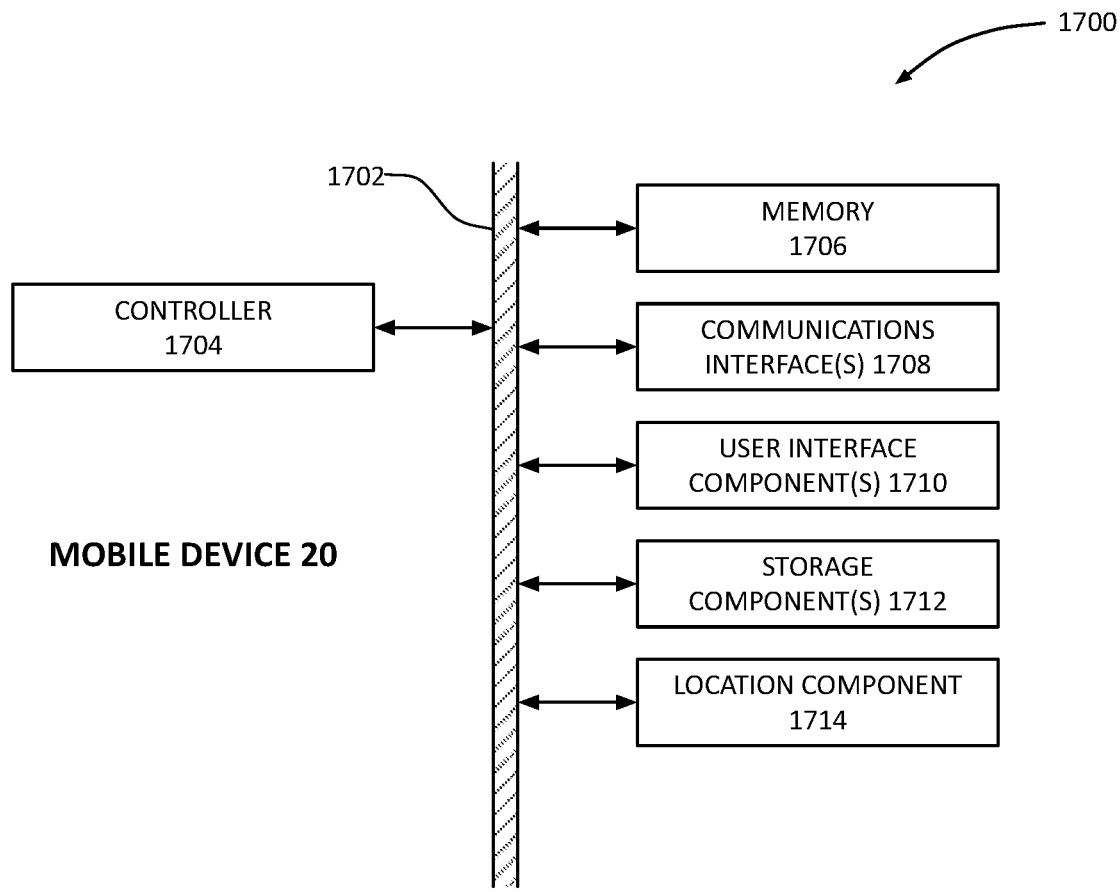
Figure 18:
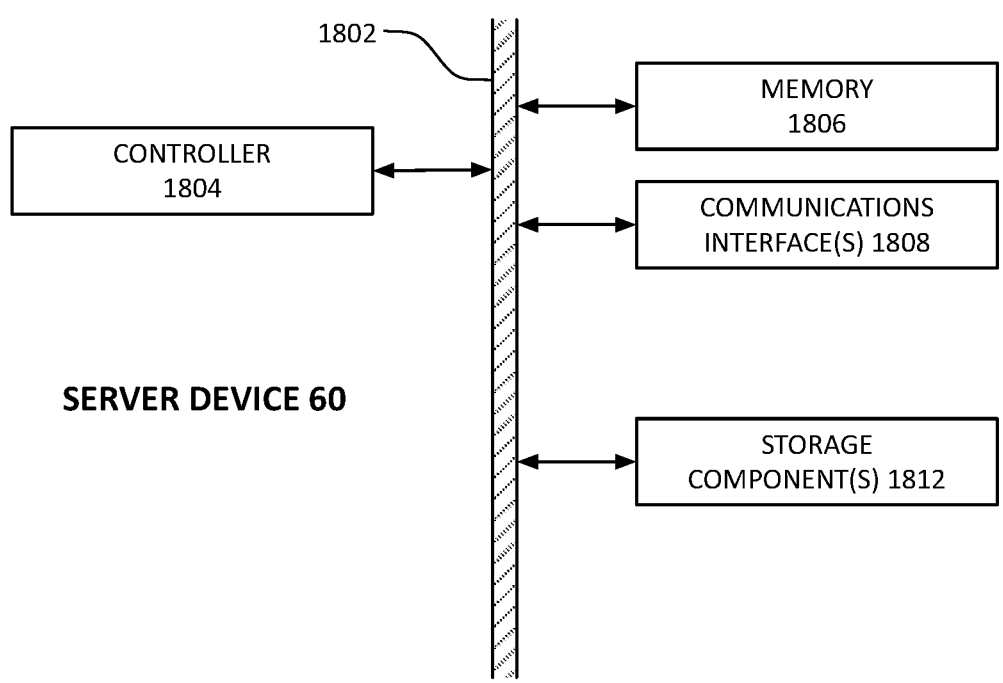

FIG. 11A graphically illustrates an exemplary user interface for setting preferences on a mobile device;

FIG. 11B graphically illustrates an exemplary user interface for specifying subject face preferences on a mobile device;

FIG. 11C graphically illustrates an exemplary user interface for specifying geographical location preferences on a mobile device;

FIG. 11D graphically illustrates an exemplary user interface for specifying time period and preferences on a mobile device;

FIG. 11E graphically illustrates an exemplary user interface specifying notification preferences on a mobile device;

FIG. 11F graphically illustrates an exemplary user interface specifying notification preferences on a mobile device;

FIG. 11G graphically illustrates an exemplary user interface for a notification dialog on a mobile device;

FIG. 11H illustrates an exemplary user interface for presenting an images-of-interest map on a mobile device;

FIG. 12A graphically illustrates a map showing the locations used in FIG. 12B that are tested to determine if they are locations-of-interest;

FIG. 12B graphically illustrates an exemplary computation for determining a geographical location-of-interest;

FIG. 13A graphically illustrates an exemplary image;

FIG. 13B graphically illustrates the image in an exemplary page from a social network showing activities related to an image that are used in computing subject affinity;

FIG. 13C graphically illustrates an exemplary computation for determining an image affinity score;

FIG. 13D graphically illustrates an exemplary computation for determining images-of-interest;

FIG. 13E graphically illustrates locations of images-of-interest overlaid on a map;

FIG. 13F graphically illustrates the images-of-interest overlaid on the map of FIG. 13E;

FIG. 13G graphically illustrates a promotional bias overlaid on the map of FIG. 13E;

FIG. 14 illustrates the images, and element found therein, for the example shown in FIGS. 13A-13E;

FIG. 15 is an exemplary hardware architecture block diagram for an exemplary machine;

FIG. 16 is an exemplary software architecture block diagram for the machine of FIG. 15;

FIG. 17 graphically illustrates a block diagram of an exemplary mobile device; and FIG. 18 graphically illustrates a block diagram of an exemplary server device.

DETAILED DESCRIPTION

Figure 1A:
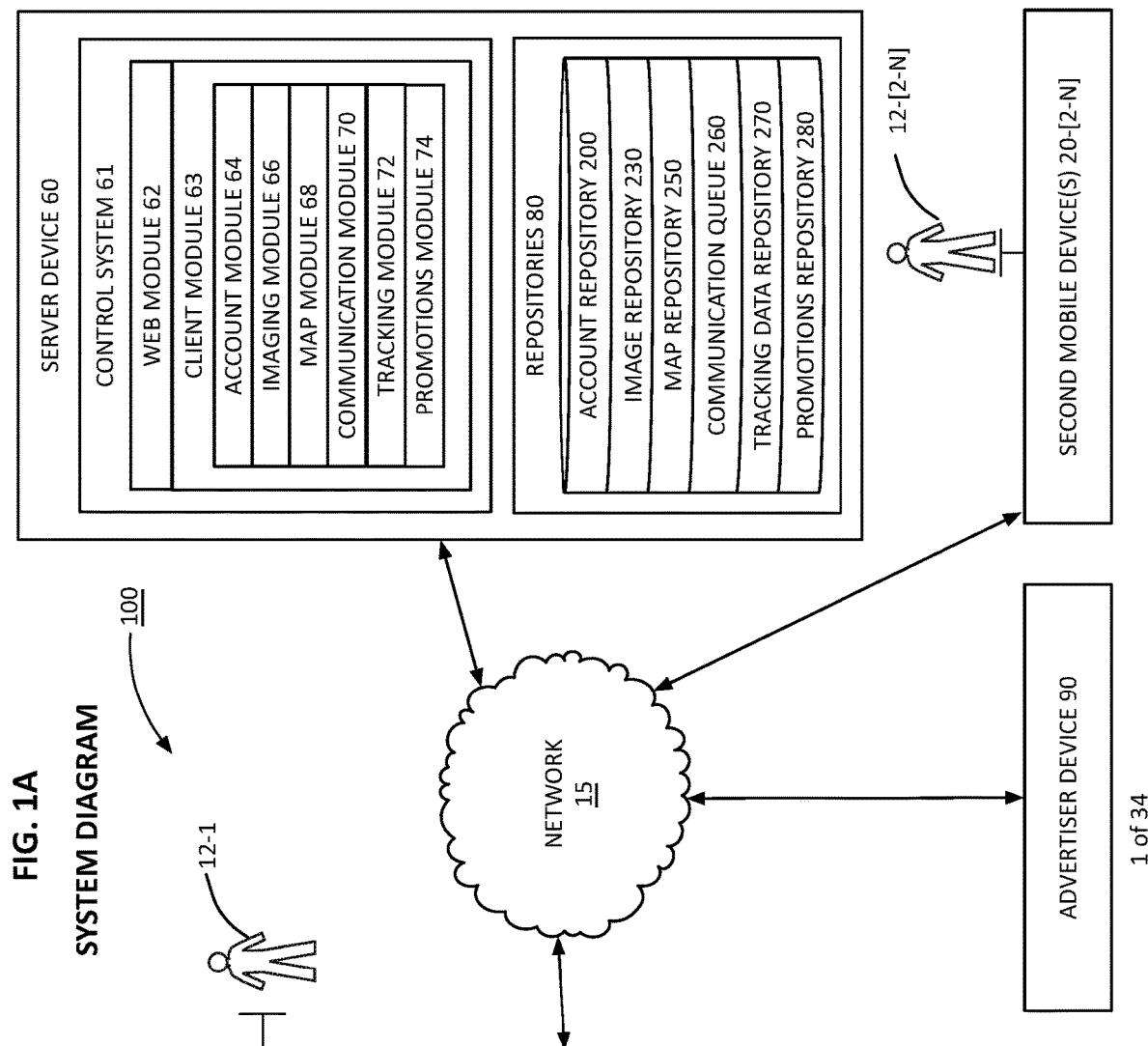
FIG. 1A is a system diagram of the entities comprising the present disclosure.

FIG. 1A illustrates an exemplary view of a system diagram for some embodiments of the present disclosure. The system includes a plurality of mobile devices 20 [1-N] coupled to a server device 60. The mobile device 20 includes a control system 21. The control system 21 includes a web module 22, client module 23, configuration module 24, triggering module 26, notification module 28, affinity prediction module 30, user interface module 32 and imaging module 40.

The configuration module 24 operates to initialize the mobile device 20 for operation. The triggering module 26 determines when one or more images of interest have been encountered and triggers the notification module 28 to queue a notification for present to the user 12 of the mobile device 20. The affinity prediction module 30 operates to determine an affinity score for one or more images, which is provided to the triggering module 26.

The user interface (UI) module 32 operates to render map data on the display of the mobile device 20 and includes a 3D engine 34, augmented reality renderer 36, and a navigation module 38. The 3D Engine 34 renders map data to produce a three-dimensional visualization. The augmented reality renderer 36 presents the one or more images of interest in the three-dimensional space. Based on user 12 inputs, the navigation module 38 moves the view perspective around within the three-dimensional space.

The imaging module 40 includes a facial detection module 42, facial matching module 44, and facial identification module 46 and performs operations on the images. The facial detection module 42 determines the existence and position of faces within an image. The facial matching module 44 operates to determine whether a face appearing in two different images is the same. The facial identification module 46 operates to determine the identity of a face appearing in an image.

The server device 60 includes a control system 61. The control system 61 includes a web module 62 and a client module 63 which includes an account module 64, imaging module 66, map module 68, and a communication module 70.

The web module 64 operates to present web content and facilitate interactions with the user in regards to said web content. The account module 65 operates to create, modify, store, and more generally manage information related to user accounts 201 in the user account repository 200. The imaging engine 66 operates to create, modify, store, and more generally manage information related to images 231 in the image repository 230. The map module 68 operates to create, modify, store, and more generally manage information related to maps 251 in the map repository 250. The communications module 70 operates to create, modify, store, and more generally manage information related to communications module 70 in the communications queue repository 260. The tracking module 72 operates to create, modify, store, and more generally manage information related to tracking items 271 in the tracking data repository 270. The promotion module 74 operates to create, modify, store, and more generally manage information related to promotion items 281 in the promotion repository 280.

The repositories 80, including the account repository 200, image repository 230, map repository 250, communications queue repository 260, tracking data repository 270, and promotions repository 280, may be stored in a filesystem at the server device 60, a database, network attached storage, storage attached network, blockchain, or any combination thereof.

The advertiser device 90 is operates to submit promotions to the promotions repository using the promotions module 74.

The network 15 is preferably a distributed, public access network, such as the Internet, wherein the server device 60, mobile device 20 and advertiser device 90 are capable of interacting with and through the network 15 using various protocols such as Transmission Control Protocol/Internet Protocol (TCP/IP), Hypertext Transport Protocol (HTTP), and File Transfer Protocol (FTP). However, those of ordinary skill in the art will appreciate that the network 15 is not limited thereto. More specifically, the network 15 may be any type of network suitable to allow interaction between the server device 60, mobile device 20 and advertiser device 90. For example, the network 15 may be a wired network, a wireless network, or any combination thereof. Further, the network 15 may include a distributed computing network, an intranet, a local-area network (LAN) and/or a wide-area network (WAN), or any combination thereof.

The repositories 71, including the account repository 200, image repository 220, venue repository 240, shotspot repository 250, camera repository 260, and session repository 270, may be stored in a filesystem at the server device 60, a database, network attached storage, storage attached network, blockchain, or any combination thereof.

Figure 1B:
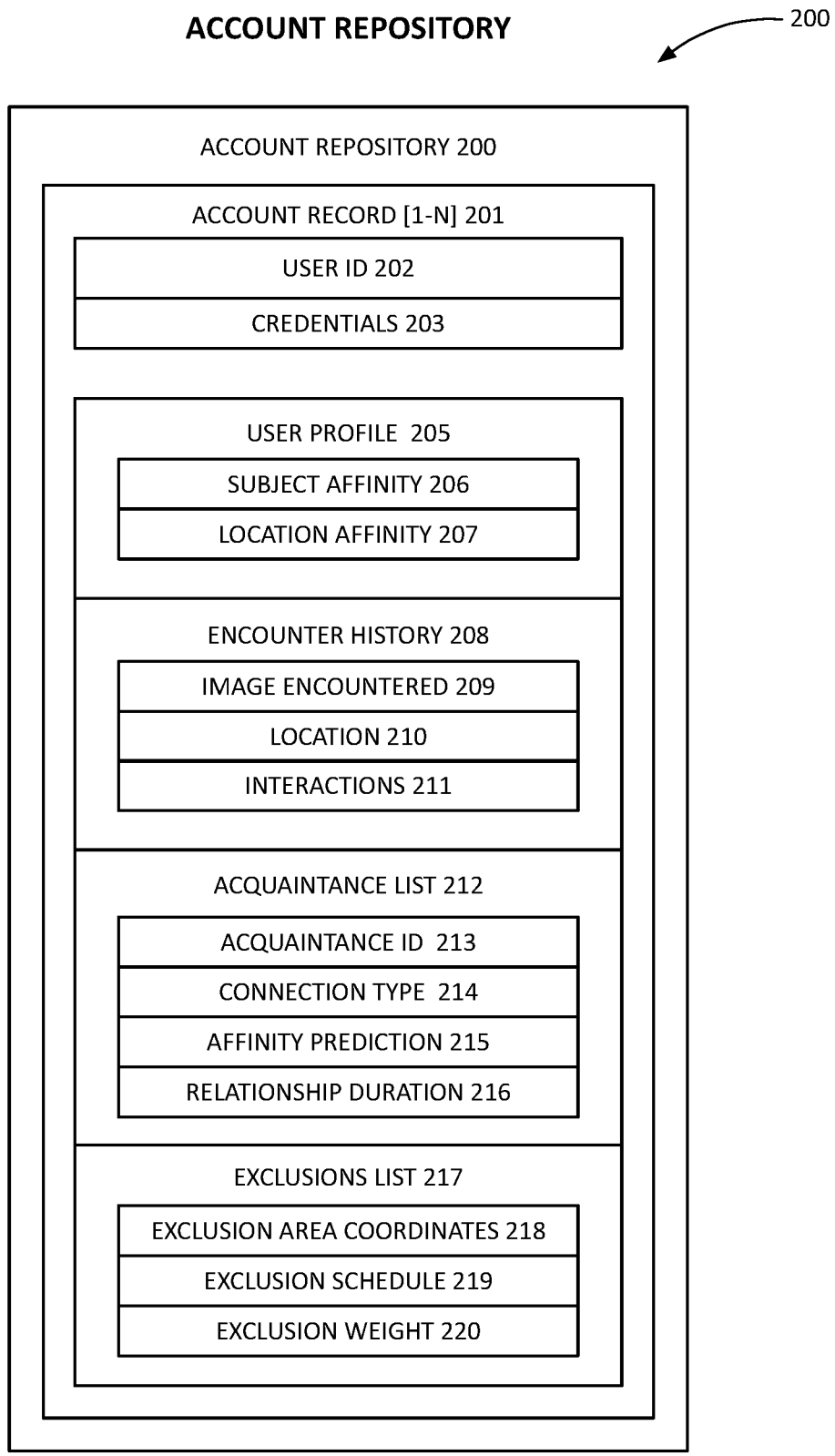
FIG. 1B illustrates an exemplary data structure for storing a user account repository according to some embodiments.

FIG. 1B illustrates an exemplary data structure 200 for storing the user account repository 200 according to some embodiments. The account module 64 performs operations on the account repository 200. The account repository 200 stores zero or more account records 201. Each account record 201 includes a user identification (ID) 202, credentials 203, location history 204, user profile 205, encounter history 208, acquaintance list 212, and exclusions list 217.

The user ID 202 uniquely identifies the user 12 that is the account owner within the system. The credentials 203 stores a user name and password.

The user profile 205 stores information about the user's preferences. The user profile 205 includes a subject affinity 206 and a location affinity 207. The subject affinity 206 identifies the subject affinity between the account owner and one or more other subjects. The location affinity 207 identifies the location affinity between the account owner and one or more other geographic locations. These values The encounter history 208 stores a history of the mobile device 20 interaction with images of interest. The encounter history 208 includes the image that was the subject of the encounter 209, location 210 encounter and interactions 211 comprising the encounter. The image encountered 209 indicates the image that was encountered. The location 210 identifies the geographic location at which the image was encountered. Interactions 211 identifies the interactions the user 12 had with the image viewed 209.

The acquaintance list 212 stores a list of acquaintances of the account owner. The acquaintance list 212 includes an acquaintance ID 213, connection type 214, affinity prediction 215, relationship duration 216. The acquaintance ID 213 stores a unique identifier of the acquaintance within the system. The connection type 214 describes the type of connection between the account owner and acquaintance. The affinity prediction 215 stores a numerical representation of an affinity prediction between the account owner and acquaintance (subject affinity). The relationship duration 216 stores the length of the relationship between the account owner and acquaintance. Examples of acquaintances include social network friends, contact list contacts, messenger contacts, persons being followed online, etc.

The exclusions list 217 stores a list of geographical exclusion areas for the account owner. The exclusions list 217 includes exclusion area coordinates 218, exclusion schedule 219, and exclusion bias 220. The exclusion area coordinates 218 identify the geographical area of the exclusion. The exclusion schedule 219 identifies the one or more times/dates during which the bias should be applied. The exclusion bias 220 identifies the magnitude of the exclusion.

Figure 1C:
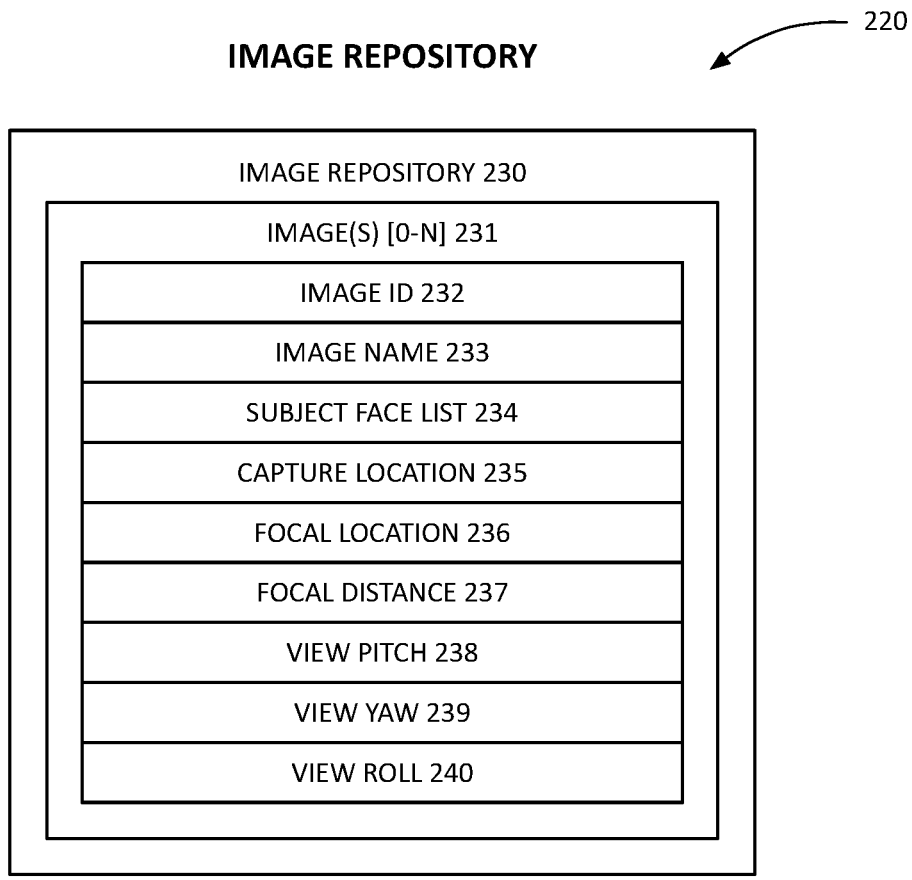
FIG. 1C illustrates an exemplary data structure for storing an image repository according to some embodiments.

FIG. 1C illustrates an exemplary data structure 230 for storing an image repository 230 according to some embodiments. The imaging module 66 performs operations on the image repository 230. The image repository 230 stores zero or more images 231. Each image 231 includes an image ID 232, image name 233, face list 234, capture location 235, capturer location 236, focal distance 237, view pitch 238, view yaw 239, and view roll 240. The image ID 232 uniquely identifies the image within the system. The image name 233 stores the alpha numeric name of the image. The face list 234 stores a list of the subject faces appearing in the image. The subject face representations may be produced by conventional facial representation generation techniques, such as techniques described in either or both of U.S. Pat. No. 5,164,992, entitled "Face recognition system" and U.S. Pat. No. 6,292,575, entitled "Real-time facial recognition and verification system". The face representation is typically in the form of a vector, which identifies each of the persons in the subject face list 234. The capture location 235 stores the geographic location of the device that captured the image at the time of capture. The focal location 236 stores the geographic location that was the focal point of the image. The focal distance 237 stores the distance between the capture location 235 and the focal location 236. The view pitch 238 stores the vertical viewing angle. The yaw pitch 239 stores the horizontal viewing angle. The view roll 240 stores the rotation angle along the viewing axis.

Figure 1D:
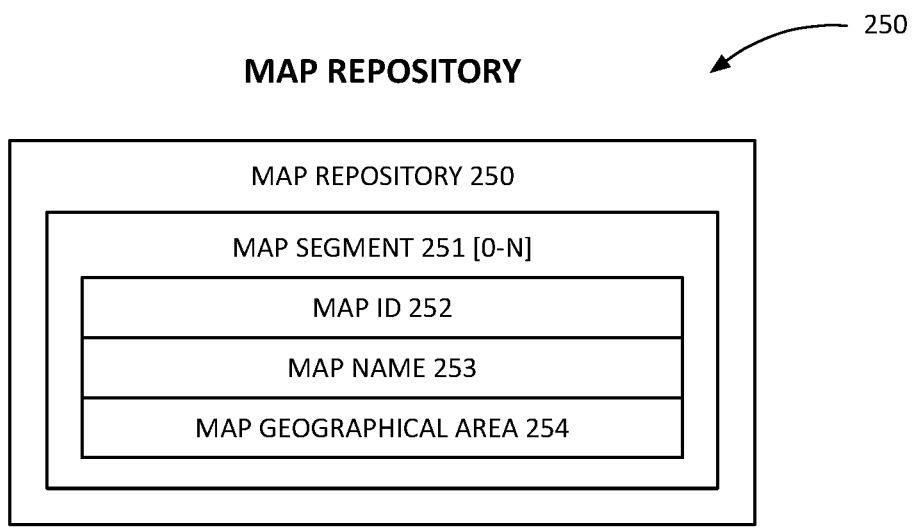
FIG. 1D illustrates an exemplary data structure for storing a map repository according to some embodiments.

FIG. 1D illustrates an exemplary data structure 250 for storing a map repository 250 according to some embodiments. The map module 68 performs operations on the map repository 250. The map repository 250 stores zero or more map segments 251. Each map segment 251 includes a map ID 252, map name 253, and map boundaries 254. The map ID 252 uniquely identifies the map segment 251 within the system. The map name 253 stores the alpha numeric name of the map segment 251.

Figure 1E:
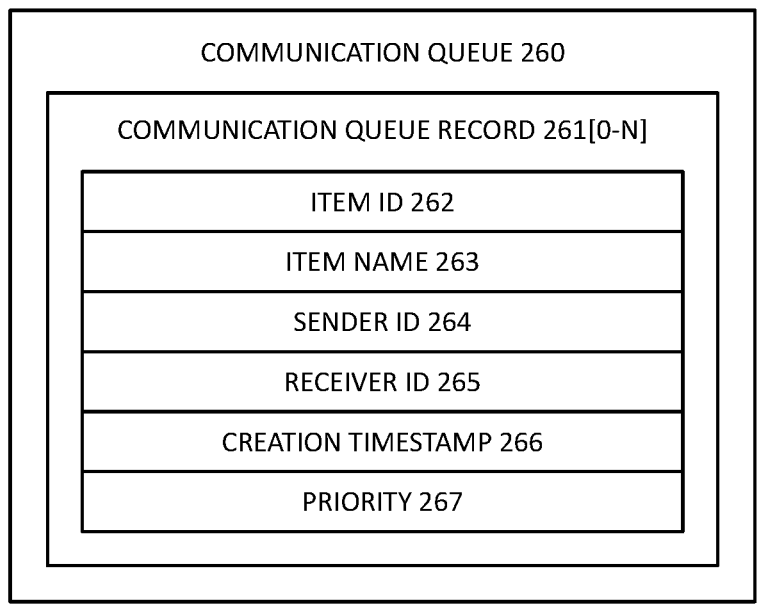
FIG. 1E illustrates an exemplary data structure for a communications queue according to some embodiments.

FIG. 1E illustrates an exemplary data structure 260 for a communications queue 260 according to some embodiments. The communications between the mobile device 20 and the server 60 are designed to operate asynchronously so that images captured at the mobile device and received at the server when there is no cellular or WIFI connection may be exchanged. This is achieved by both the client and the server maintaining a communications queue on each end. When connectivity is re-established, any pending items in the queues are transmitted. The communications queue 260 is comprised of zero or more communications queue records 261. Each communications queue records 261 includes an item ID 262, item name 263, sender ID 264, receiver ID 265, creation timestamp 266, and priority 267. The item ID 262 uniquely identifies the communications queue record 261 within the queue. The item name 263 stores an alphanumeric description of the communications queue record 261 contents. The sender ID 264 uniquely identifies the originator of the communications queue record 261 and the receiver id 265 uniquely identifies the intended recipient. The creation timestamp 266 represents the time/date that the communications queue record 261 was created. The priority 267 indicates the relative priority of the communications queue record 261 within all communications queue records 261.

Figure 1F:
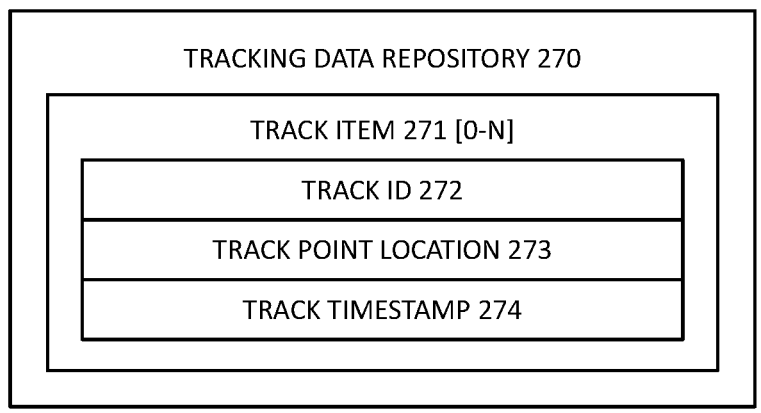
FIG. 1F illustrates an exemplary data structure for a tracking data repository according to some embodiments.

FIG. 1F illustrates an exemplary data structure 270 for a tracking data repository 270 according to some embodiments. The tracking data repository 270 includes zero or more track items 271, each track item including a track id 272, track point location 273, and track timestamp 274. The track id 272 uniquely identifies the track item 271 among all track items 271 in the tracking data repository 270. The promotion track point location 273 identifies the point location 273 at which the track item 271 was recorded. In some embodiments, the track point location 273 is specified by a GPS coordinates. The track timestamp 274 identifies the date and time at which the track item 271 was recorded.

FIG. 1G illustrates an exemplary data structure 280 for a promotions repository 280 according to some embodiments. The promotions repository 280 includes zero or more promotion items 281, each promotion item including a promotion id 282, promotion geographical area 283, and promotion weight 284. The promotion id 282 uniquely identifies the promotion item 281 among all promotion items 281 in the promotions repository 280. The promotion geographical area 283 identifies the boundaries of the geographical area to which the promotion weight 284 applies. In some embodiments, the promotion geographical area 283 is specified by three or more GPS coordinates and may be of arbitrary shape. In some embodiments, the promotion geographical area 283 is specified by a single GPS coordinate and any information necessary to specify a shape and its corresponding size. The shape of the promotion geographical area 283 may be a triangle, square, rectangle, circle, etc. The promotion weight 284 identifies the weight that is to be applied to the promotion items 281 when ranking the promotion item 281 against other promotion items 281 and/or computing a location-of-interest score.

Figure 2A:
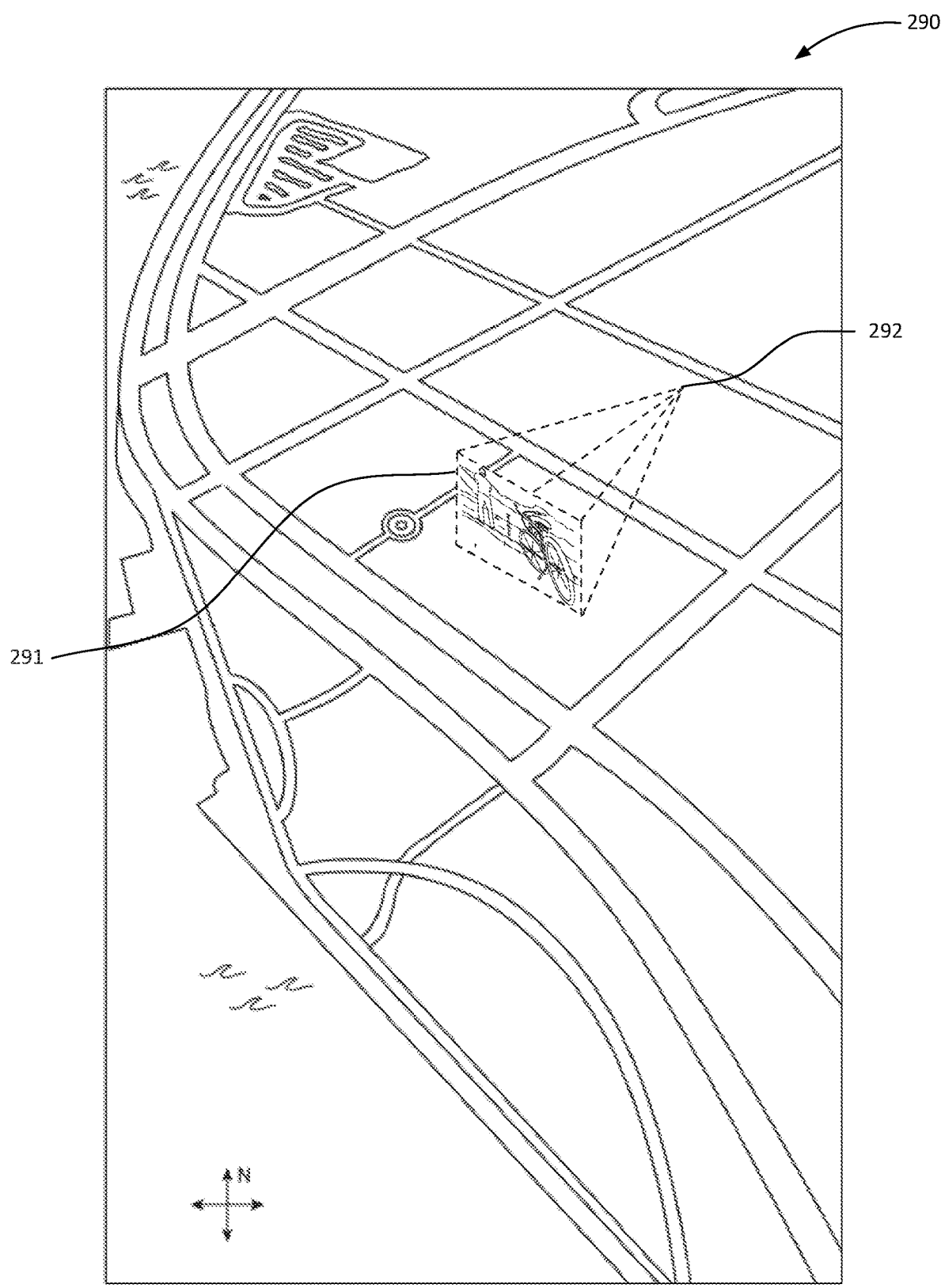
FIG. 2A illustrates an exemplary illustration of an image being presented in an augmented reality environment from a first visual perspective.

FIG. 2A illustrates an exemplary illustration 290 of an image being presented in an augmented reality environment from a first visual perspective of a viewer. The image 291 is superimposed on the map 290. In some embodiments, the location 292 of the person having captured the image is presented on the map 295.

Figure 2B:
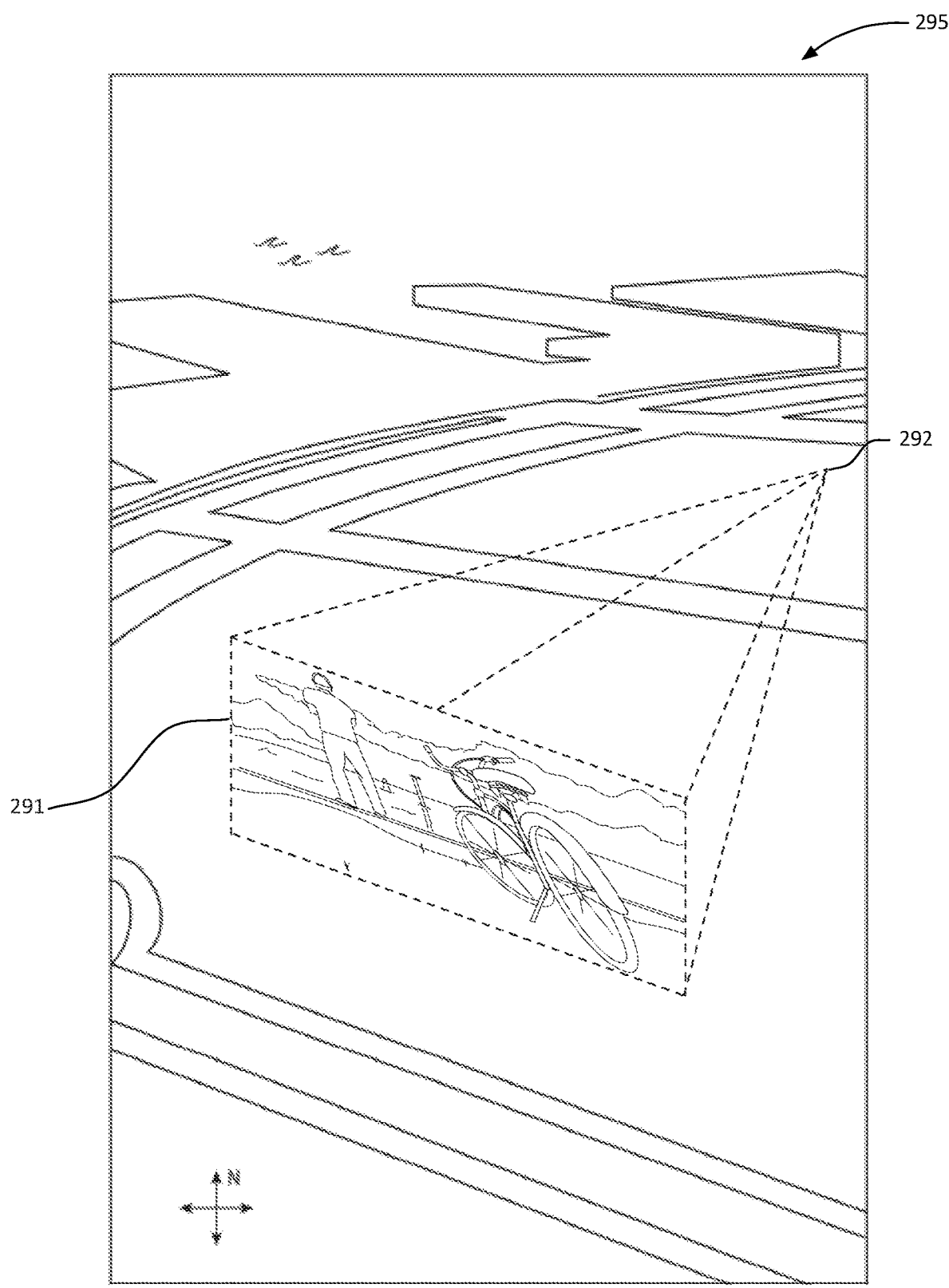
FIG. 2B illustrates an exemplary illustration of an image being presented in an augmented reality environment from a first visual perspective.

FIG. 2B illustrates an exemplary illustration 295 of an image being presented in an augmented reality environment from a second visual perspective of the viewer. The second visual perspective is lower to the ground and to the left.

Figure 3A:
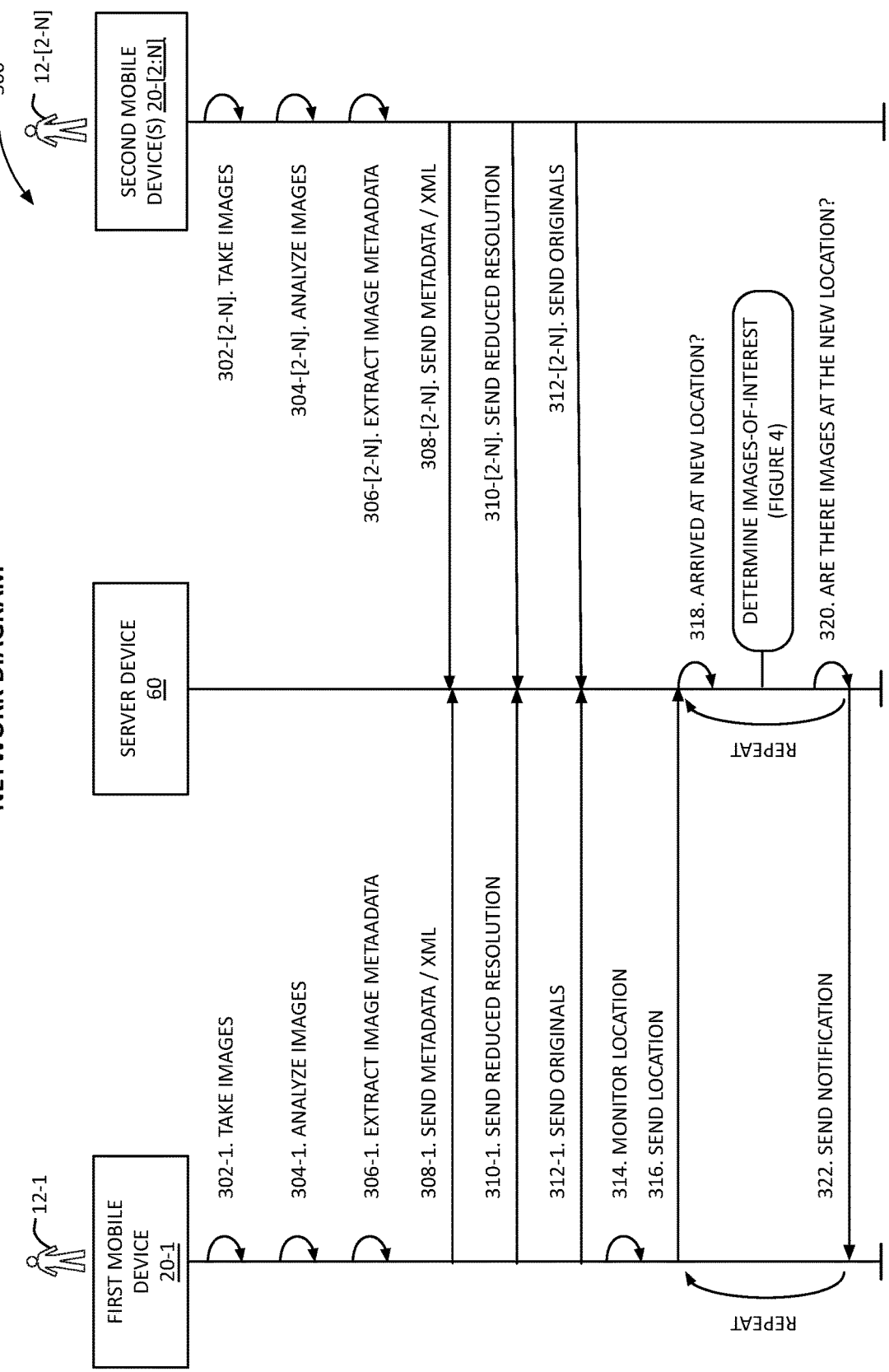
FIG. 3A is a network diagram showing the communications between mobile devices and the server device.

FIG. 3A illustrates an exemplary network diagram 300 for the system of FIG. 1. Images are captured 302 by the mobile devices 20. The captured images are stored with corresponding metadata. The metadata may include capture time, date, geographic location, camera settings, and the like. The captured images are analyzed 304 to determine subject faces present in the images using the imaging module 40. In some embodiments metadata is extracted 306 from the images and sent to the server device 60 for storage. In some embodiments, reduced resolution versions of the images are sent 310 to the server device 60 for storage. In some embodiments, full resolution versions of the images are sent 312 to the server device 60 for storage. In some embodiments, duplicative image data and/or metadata is stored at both the mobile device 20 and server device 60. The mobile device 20-1 monitors 314 the geographic location of the mobile device 20 and sends 316 the information to the server device 60 as the location changes. If the server device 60 determines 318 that the mobile device 20 has arrived at a new location, then the server device 60 determines 320 if there are new images in the interest area according to FIG. 4. If new images are found 320, a notification is sent 322 to the mobile device 20-1.

Figure 3B:
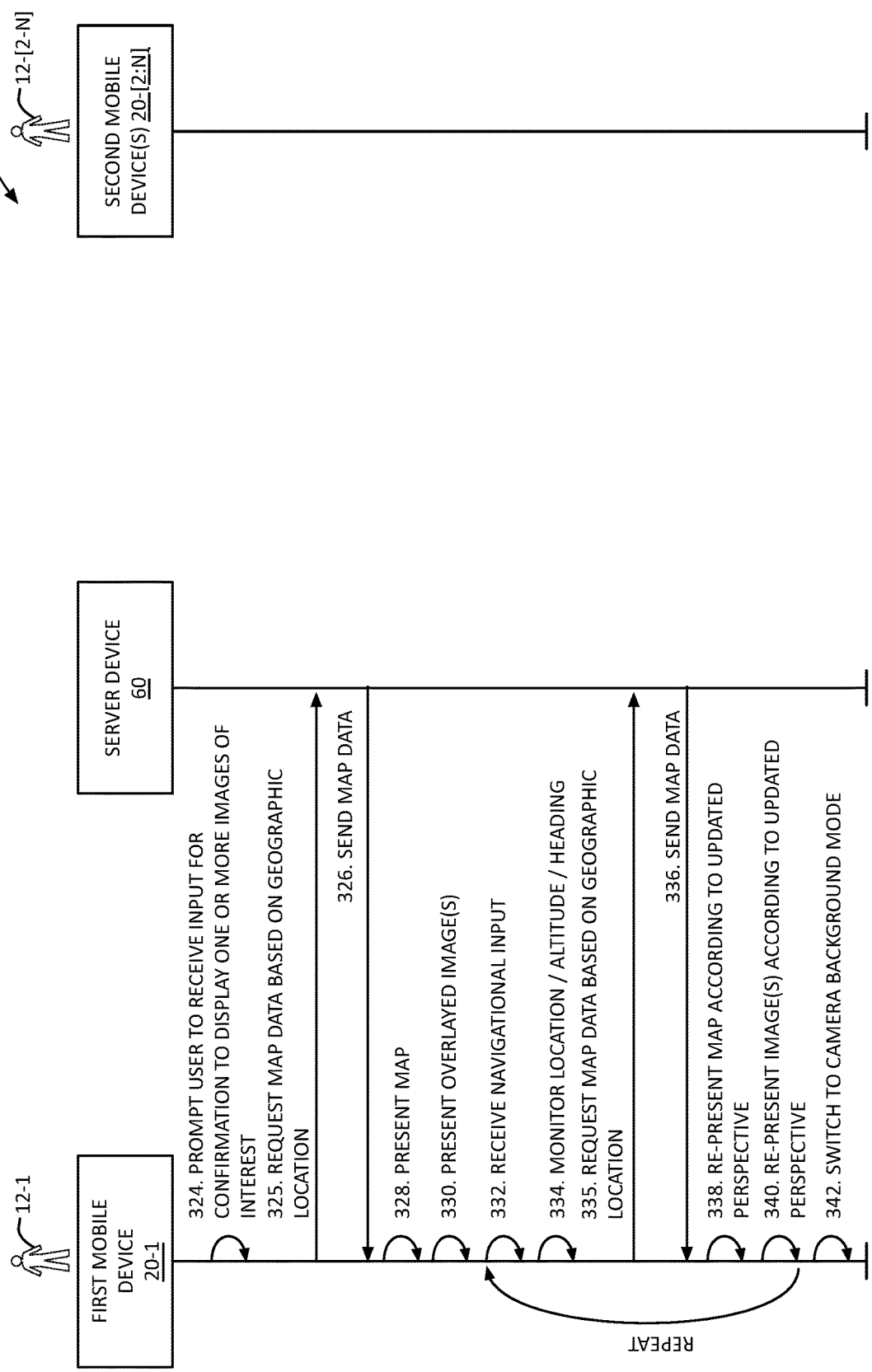
FIG. 3B is a network diagram showing the communications between mobile devices and the server device.

FIG. 3B is a network diagram 300 showing the communications between the mobile devices and the server device 60. The mobile device 20 provides notification to the user 12 and based on user 12 input received 324 in response to the notification, the mobile device 20 may present an augmented reality view by presenting a map 328 and overlaying 330 one or more images on the map. The user 12 of the mobile device 20 provides 332 navigational inputs to the mobile device 20 by moving the device around in the physical world as the mobile device 20 monitors the pitch, yaw, and roll of the mobile device 20 in real-time. This is monitored 334 at the mobile device 20 and the augmented reality view is updated 336, using additionally requested 335 and received 336 map data if needed by presenting 338 the map according to the new updated perspective and presenting 340 the images according to the updated perspective. As the user leaves the geographic location, the steps of FIG. 3A are repeated.

Figure 4:
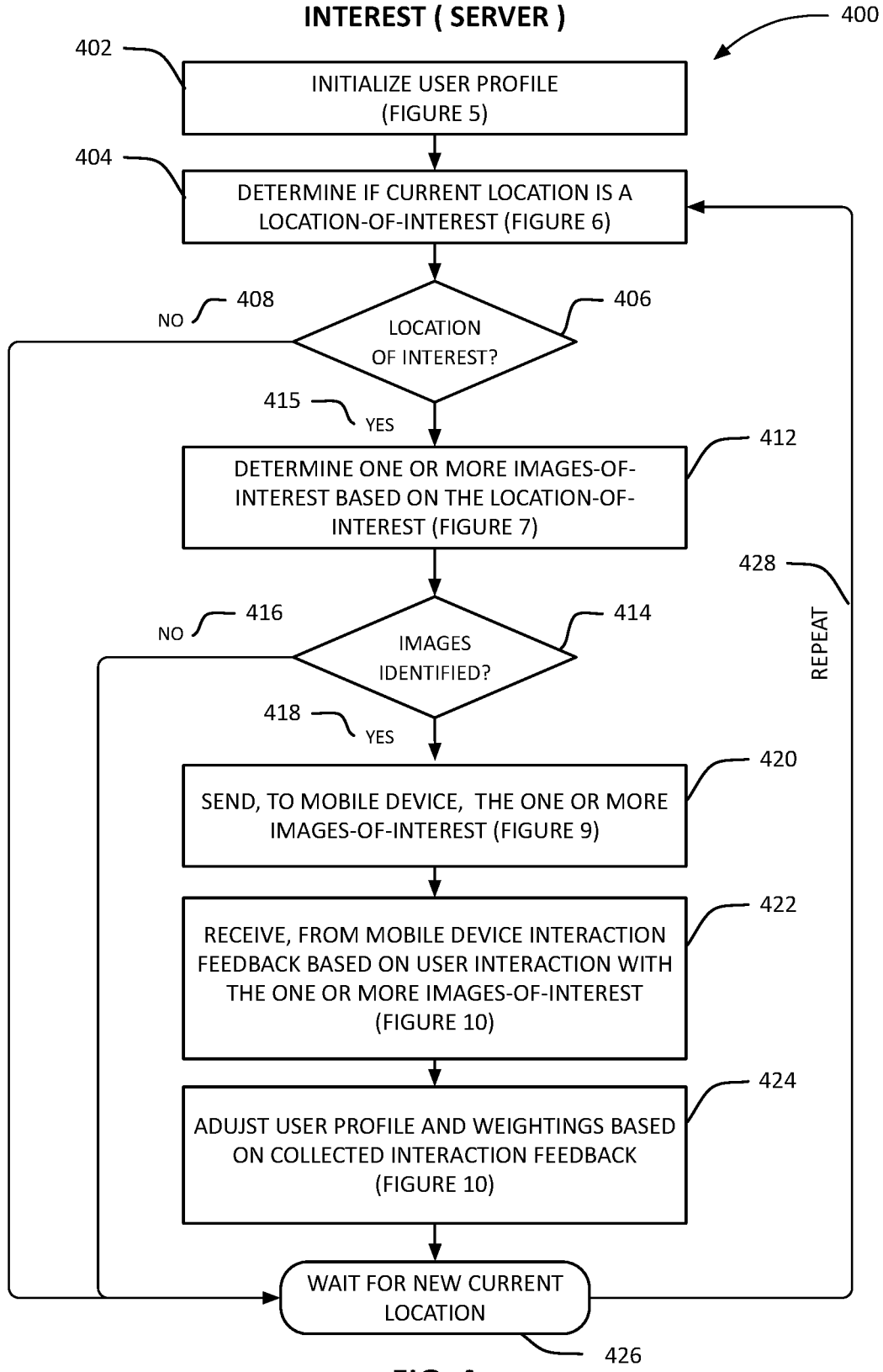
FIG. 4 is a flowchart illustrating the process involved in determining if a location is a location-of-interest, determining images-of-interest, presenting them, collecting feedback, and adjusting computational parameters.

FIG. 4 describes an exemplary process 400 for determining one or more images-of-interest. A user profile is initialized 402 using elements such as those described in FIG. 5. Based on a current geographical location, a determination 404 is made as to whether the current location should be treated as a location-of-interest. Some embodiments accomplish this using elements such as those described in FIG. 6. A check is performed 406, and based on the outcome the new location can either be ignored 408, or the process continued 415 determining 412 one more images-of interest. Some embodiments accomplish this determination using elements such as those described in FIG. 7. If no images-of interest are identified 416, the current location is ignored. Otherwise 418, the process continues with the presentation 420 of one or more images-of interest. Some embodiments accomplish this presentation using elements such as those described in FIG. 9. Interaction feedback is collected 422 based on user 12 inputs collected at the mobile device based on the presentation of the one or more images-of-interest. Based on the collected interaction feedback, the user profile is updated 424, and the process waits 426 for a new current location to be identified. Process flow then repeats 428.

Figure 5:
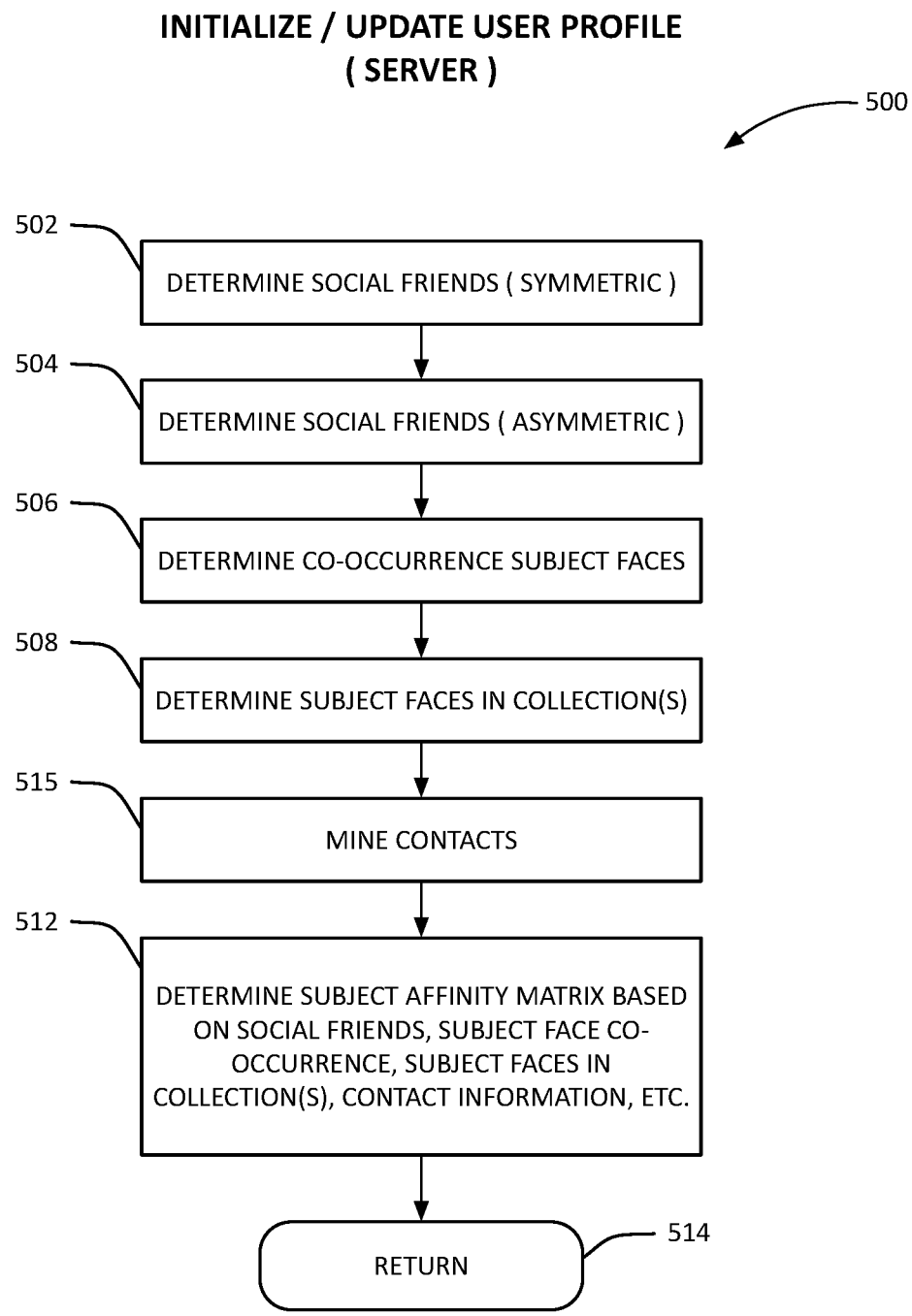
FIG. 5 is a flowchart illustrating an exemplary process for initializing and updating a user profile.

FIG. 5 describes an exemplary process 500 for initializing and/or updating a user profile. Social Networks of which the user 12 of the mobile device 20 is associated are queried 502 to extract information identifying symmetric social friends of the user 12 to determine subject affinities. The same and/or different/additional social networks are queried to determine asymmetric social friends. Image collections associated with the user 12 are analyzed to identify subject face co-occurrence 506 and determine subject affinities. Image collections associated with the user 12 are analyzed to identify subject faces occurring in those collections 508 and determine subject affinities. Contacts associated with the user 12 are analyzed 510 to determine subject affinities. A subject affinity matrix is assembled based on the aforementioned collected information 512. Process flow is complete 514.

As used herein, the term "social network" refers to a server device that enables client devices associated with users to create and store electronic friend relationship information. Those friend relationships may be symmetric in that one user invites another user to connect (or link), and the other user must accept the electronic invitation before the symmetric friend relationship is created and stored by the server device. The friend relationships may also be asymmetric in that one user may request to follow another user, and the other user need not accept before the asymmetric friend relationship is created and stored by the server device. In some embodiments, the server device may be operable to support both symmetric and asymmetric friend relationships. Examples of server devices that should not be considered social networks are e-mail systems and trust networks. With e-mail, all you need is someone e-mail address to be able to communicate with them and friending is not required. Trust networks typically operate on inference engines where trust is inferred by actions taken by the various users who need not be connected as friends. A server device may be both a social network and a trust network, but just by being one, does not automatically make it the other. An example of a trust network is a news site that enables visitors to comment on articles. Visitors that often contribute valuable comments are awarded a high trust rating. Visitors who contribute off topic comments laced with profanity are awarded a low trust rating.

As used herein, the term "social graph" refers to the electronic friend connections (symmetric and/or asymmetric) typically stored by the server device and representing the aforementioned relationships. In some embodiments, this information may be available for export by the server device, such as is the case with Facebook Connect.

As used herein, the term "social distance" refers to the number of hops in the social graph to get from one user to another user. For example, the social distance between two friends is one. The social distance between a user and a friend of a friend of a friend is three. The lower the social distance, the closer the relationship.

Figure 6:
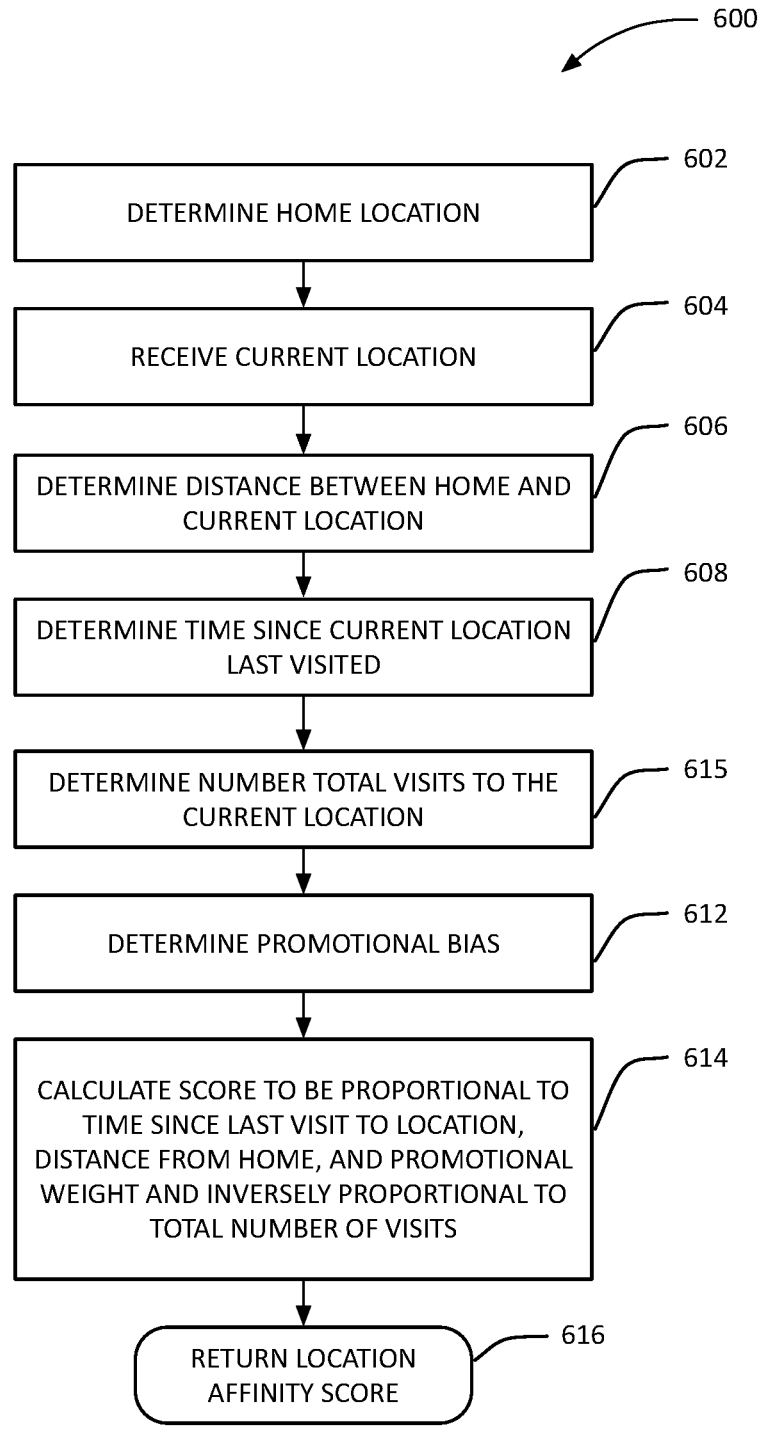
FIG. 6 is a flowchart illustrating an exemplary process for determining if a location is a location-of-interest.

FIG. 6 describes an exemplary process 600 for determining if a current location is a location-of-interest. A home geographical location is determined 602. This may be accomplished by tracking the geographic location movement of the mobile device of the user 12 and identifying a location where the device is stationary for the largest portion of the day. The tracking date of the geographic location movement of the mobile device of the user 12 may be stored in a tracking data repository 270. For example, if a user 12 sets their mobile device on the night stand for eight hours a night, that is typically indicative of a home location. The home geographical location may be expressed in GPS latitude/longitude coordinates. A current geographical location may be determined 604 in a number of ways. Examples include from the GPS receiver on the mobile device, WIFI triangulation, cellular tower triangulation, etc. Multiple determination methods may be combined. The current geographical location may be expressed in GPS latitude/longitude coordinates. The distance between the home location and current location is determined 606. A number of processes exist for making this determination, including the haversine formula shown in Equation 1 as shown below. Using the tracking database, the time since a mobile device of the user 12 last visited the current location is determined 608 by identifying the most recent entry in the database from said location and taking the difference of the current time to the timestamp of that entry. The total number of visits to the current location is determined 610 by identifying the number of entries in the tracking database corresponding to the current location. Two locations may be treated as the same location for purposes of comparison if they differ by less than a difference threshold. Examples of difference thresholds may include 10 ft, 100 ft, 1000 ft, a half mile, a mile, 5 miles, 10 miles, 20 miles, etc. For example, the length of the island of Manhattan 1206-34 is 13 miles. To determine previous visits to Manhattan 1206-34 when the mobile device is located in the center of the island, a difference threshold of 13/2 miles may be used. One or more promotional biases that apply to the current location may be retrieved 612 from the promotions repository 280. Next, a location affinity score is determined 614. In some embodiments, the score is calculated to be proportional to time since last visit, distance from home, and promotional bias and inversely proportional to total number of visits. In some embodiments, Equation 2 as shown below is used to compute the location affinity score. The location affinity score is returned 616.

Figure 7:
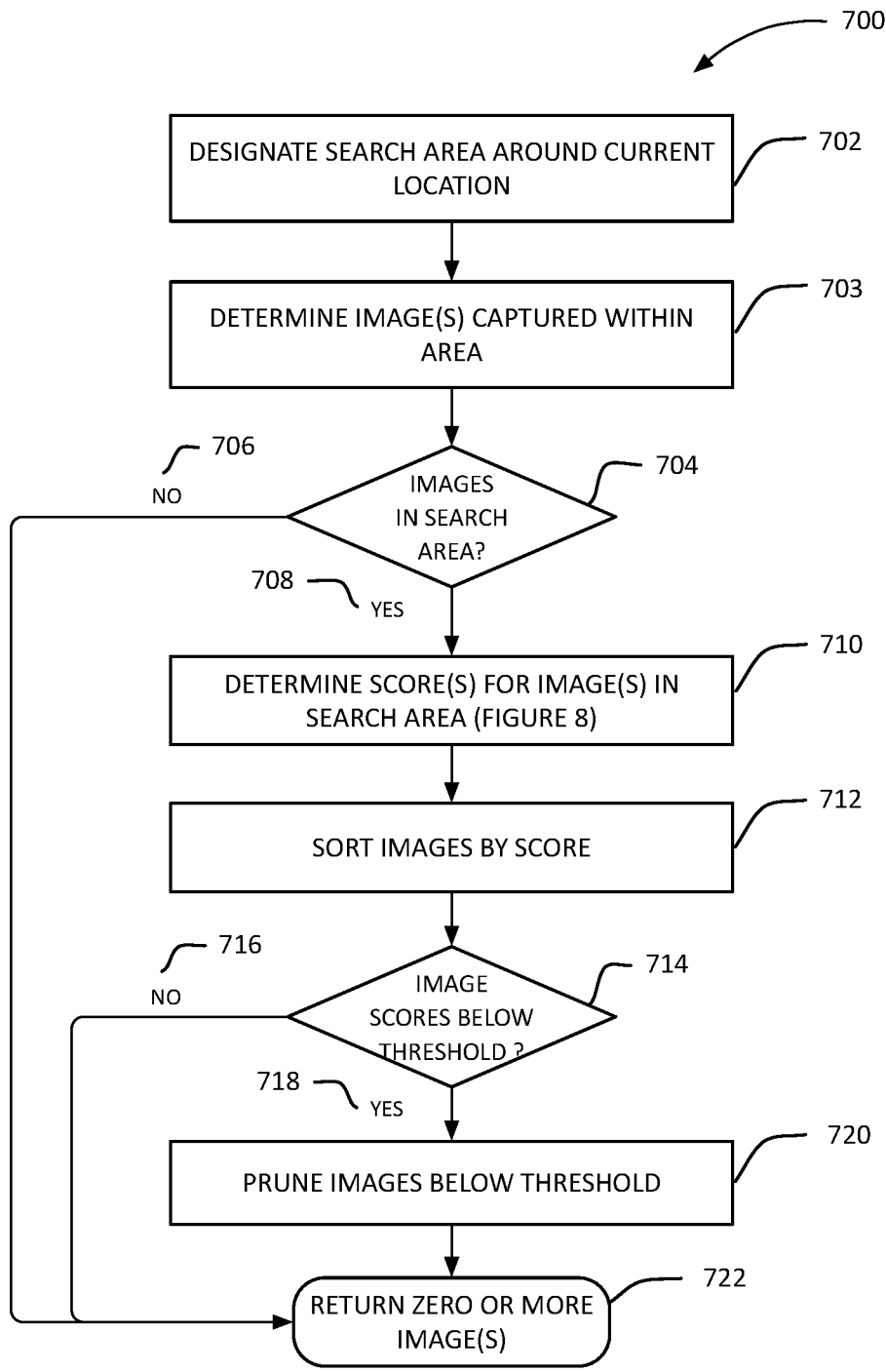
FIG. 7 is a flowchart illustrating an exemplary process for determining one or more images-of-interest.

FIG. 7 describes an exemplary process 700 for determining one or more images-of-interest based on a location-of-interest. A search area 1390 is designated 702 for bounding the search. Images have been captured within the search area are determined 703. If no images are identified 706 for the search area, the process ends 722. If one or more images are identified 708, scores are determined 710 for the images captured within the search area. The one or more images may be sorted 712 by their affinity scores. A comparison is made 714, and If all images are above a threshold 716, the process ends. Otherwise 718, the images below the threshold are removed 720. Zero or more images-of-interest images are returned 722.

In some embodiments, the size of the search area is designated based on a speed of travel of the first mobile device as measured over a time interval. For example, if the user is traveling in a car versus walking on foot, then the search area may be made larger since the area being covered by the mobile device is larger.

In some embodiments, the shape of the search area is designated based on a direction of travel of the first mobile device as measured over a time interval. For example, if the user has been traveling in a straight line for a period of time, it is likely that the direction of travel will remain the same for the immediate future. Thus, the shape of the search area may be elongated all the expected travel path.

In some embodiments, the size of the search area is designated based on an altitude of travel of the first mobile device as measured over a time interval. For example, if the user is traveling at 30,000 feet in an airplane, then search area may be made larger based on the user's ability to see more of the earth's surface.

Figure 8A:
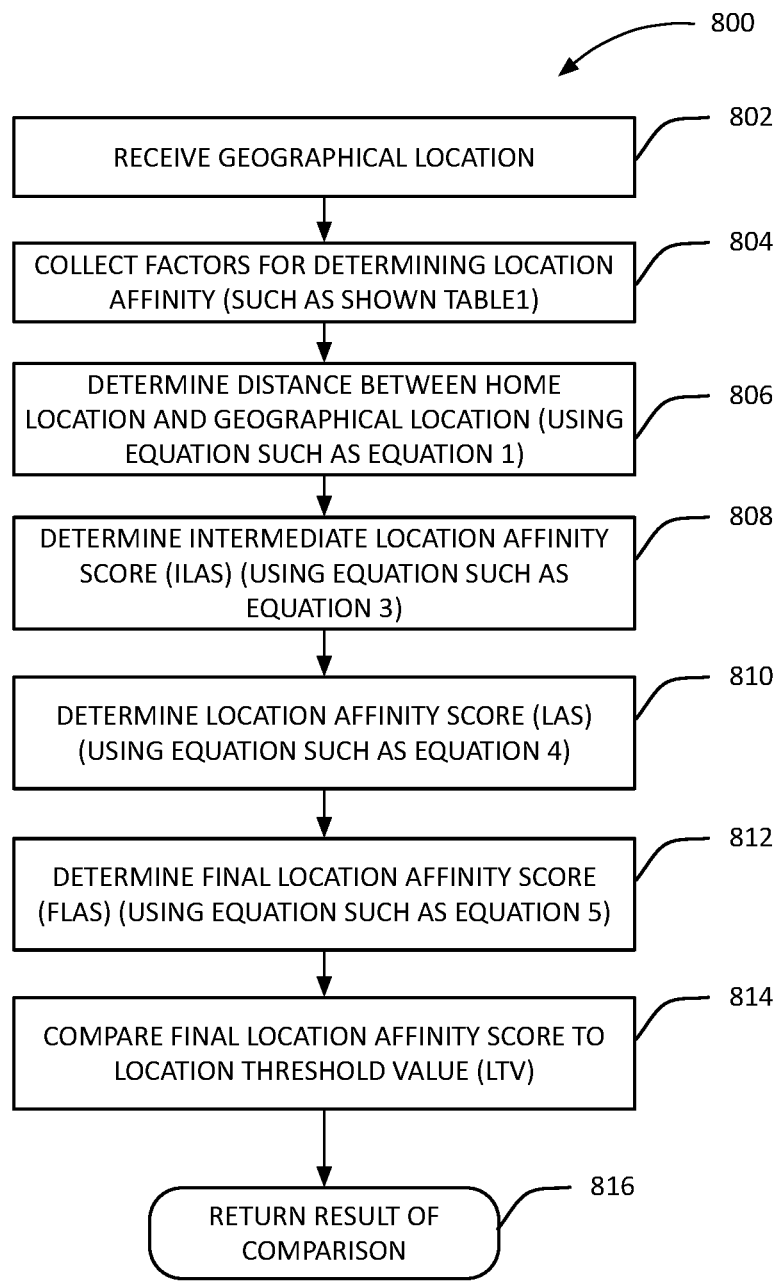
FIG. 8A is a flowchart illustrating an exemplary process for determining a location-of-interest.

FIG. 8A is a flowchart illustrating an exemplary process 800 for determining a location-of-interest. Referring now to FIG. 8A, the server device 60 receives 802 a geographical location. Factors are collected 804 for determining location affinity. In some embodiments, factors such as those shown Table 1 shown below are used. A distance between home location and geographical location is determined 806. In some embodiments, an equation such as Equation 1 shown below is used. An intermediate location affinity score (ILAS) is determined 808. In some embodiments, an equation such as Equation 3 shown below is used. A location affinity score (las) is determined 810. In some embodiments, an equation such as Equation 4 shown below is used. A final location affinity score (FLAS) is determined 812. In some embodiments, an equation such as Equation 5 shown below is used. A comparison between the final location affinity score and a location threshold value (LTV) 814 is performed. The result of the comparison is returned 816.

Figure 8B:
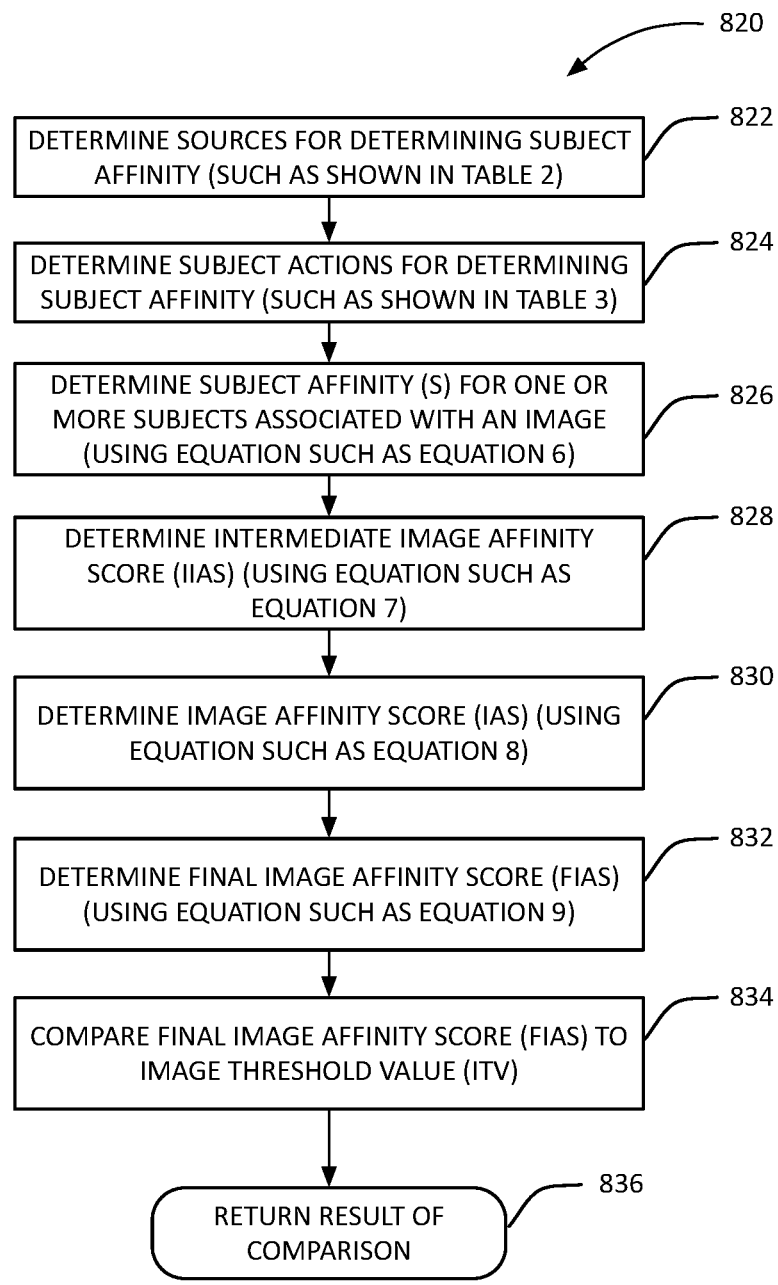
FIG. 8B is a flowchart illustrating an exemplary process for determining an image-of-interest.

FIG. 8B is a flowchart illustrating an exemplary process 820 for determining an image-of-interest. Referring now to FIG. 8B, the server device 60 collects 822 sources for determining subject affinity. In some embodiments, factors such as those shown Table 2 shown below are used. Subject actions for determining subject affinity are determined 824. In some embodiments, subject actions such as those shown Table 3 shown below are used. Subject affinity(s) for one or more subjects associated with an image is determined 826. In some embodiments, an equation such as Equation 6 shown below is used. Intermediate image affinity score (IIAS) is determined 828. In some embodiments, an equation such as Equation 7 shown below is used. Image affinity score (IAS) is determined 830. In some embodiments, an equation such as Equation 8 shown below is used. Final image affinity score (FIAS) is determined 832. In some embodiments, an equation such as Equation 9 shown below is used. A comparison of the final image affinity score (FIAS) to an image threshold value (ITV) is performed 834. The result of the comparison is returned 836.

Figure 9:
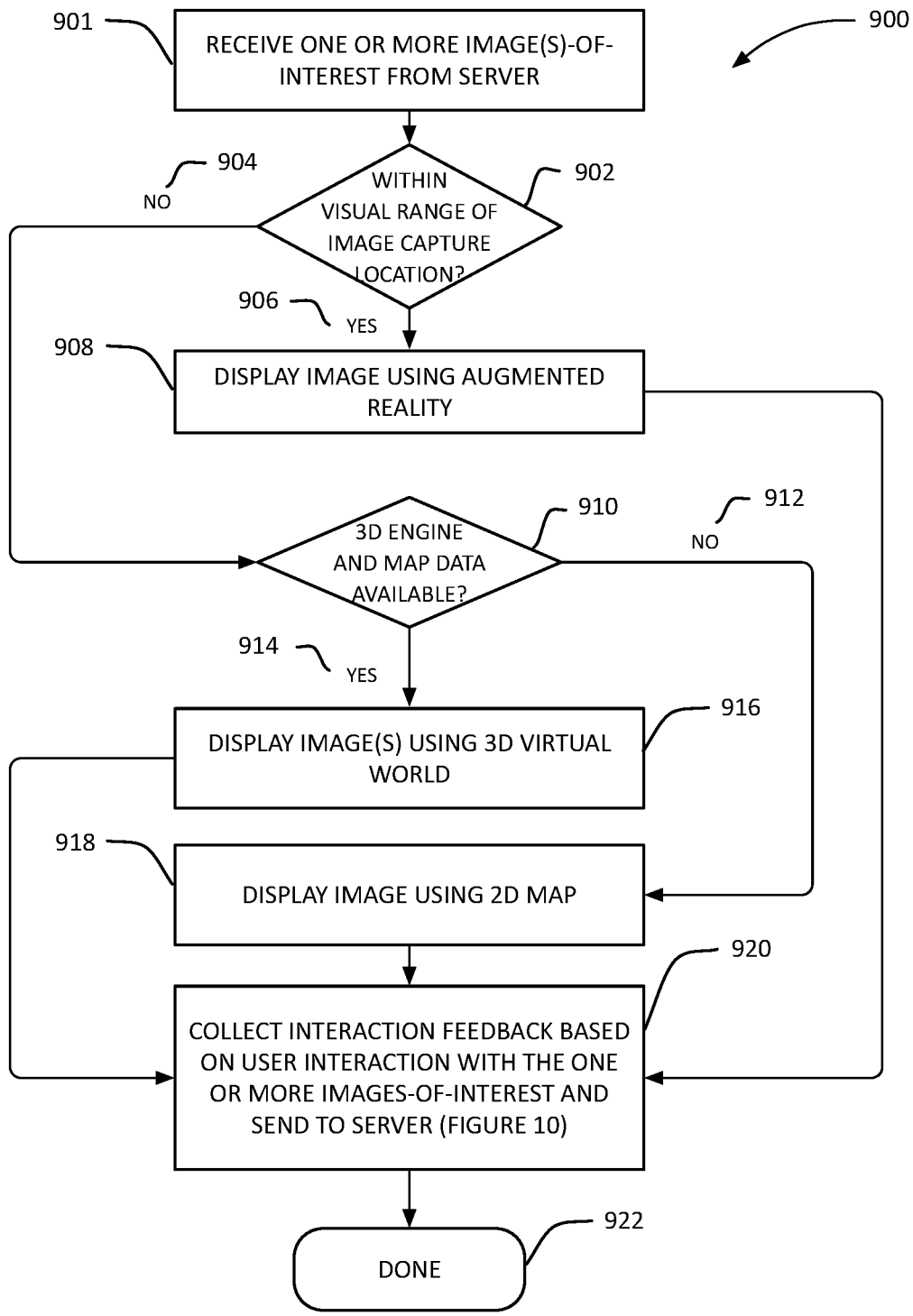
FIG. 9 is a flowchart illustrating an exemplary process for presenting one or more images-of-interest.

FIG. 9 is a flowchart illustrating an exemplary process 900 for presenting one or more images-of-interest. Referring now to FIG. 9, one or more image(s)-of-interest are received 901 from the server device 60. If the mobile device 20 receiving the one or more image(s)-of-interest is within 902 visual range of the capture location of ones of the one or more image(s)-of-interest, the images may be presented using augmented reality techniques. Otherwise 904, a check is performed 910 to determine if map data is available for a 3D presentation. If yes 914, the one or more image(s)-of-interest are presented 916 using the 3D engine. If not 912, the one or more image(s)-of-interest are presented 918 using 2D map data. In all cases, user interaction feedback is collected 920 and sent to the server device for storage as encounter history 208. In some embodiments, the user is able to manually select the presentation mode, if available, for presentation of the one or more image(s)-of-interest.

Figure 10:
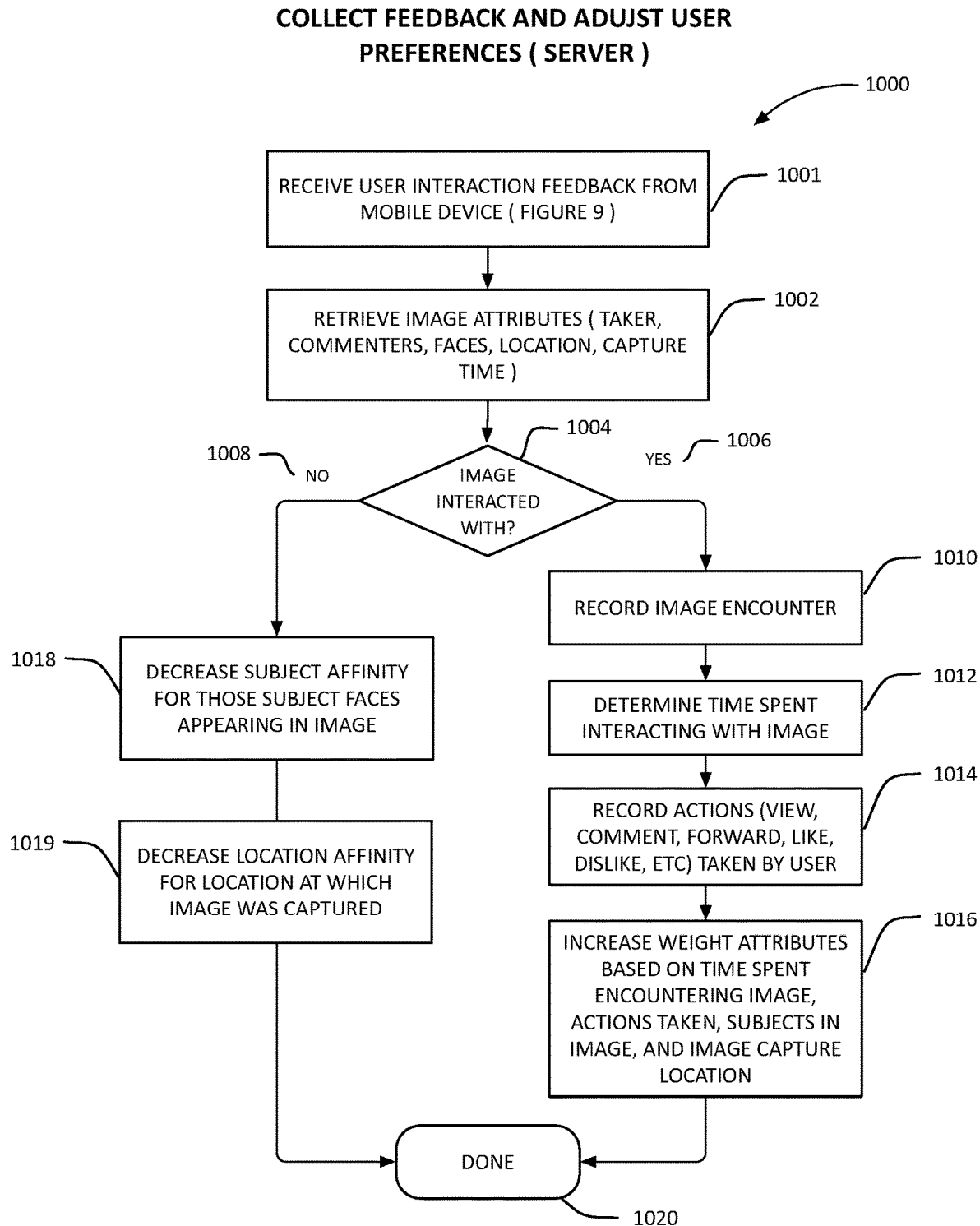
FIG. 10 is a flowchart illustrating an exemplary process for collecting feedback and adjusting user preferences.

FIG. 10 describes an exemplary process 1000 for collecting feedback and adjusting user preferences. In general, if the user 12 of the mobile device 20 was notified of the presence of an image-of-interest and did not interact with it 1008, the preferences are adjusted to lessen that probability that images like that image will be scored as an image-of-interest. If the user 12 of the mobile device 20 was notified of the presence of an image-of-interest and did interact with it 1006, the preferences are adjusted to increase the probability that images like that image will be scored as an image-of-interest. Referring now to the flowchart, user interaction feedback is received 1001 from the mobile device 20. Image attributes, such as who captured the image, commenters, subject faces within the image, geographical location (GPS coordinates), and capture time are retrieved 1002. A check is made to determine if the image was interacted with 1004. If the image was not viewed 1008, then weightings of the various parameters are decreased and/or de-emphasized. In particular, subject affinities for those subject faces appearing in the image are decreased 1018 and the location affinity associated with the location at which the image was captured is decreased 1019. If the image was interacted with 1006, the encounter is recorded 1010. The amount of time spent interacting with the image is determined and recorded 1012. Specific interactions with the image such as viewing, commenting, annotating, forwarding, posting, saving, copying, retweeting, etc., are recorded 1014. Weightings of the various parameters are increased and/or emphasized 1016. The process completes 1020.

FIG. 11A graphically illustrates an exemplary user interface 1100 for setting preferences on a mobile device. The preference dialog window 1100 includes a title 1102 and number of controls for navigating to other sub-dialog windows. The controls include a subject face preferences button 1103 for navigating to a subject face preferences dialog window 1110 a geographical locations preferences button 1104 for navigating to a geographical locations preferences dialog window 1120, a time period preferences button 1105 for navigating to a time period preferences dialog window 1130, a notifications preferences button 1116 for navigating to a notifications preferences dialog window 1140, a presentation preferences button 1117 for navigating to a presentation preferences dialog window 1150, and a "done" button 1118 for leaving the preference dialog window 1100.

FIG. 11B graphically illustrates an exemplary user interface 1110 for specifying search preferences on a mobile device 20 for identifying locations-of-interest. The search preferences dialog window 1110 includes a title 1112, subject faces controls 1114, subject face selection control 1116 and image source controls 1118.

The server device designates images-of-interest in part by determining a subject affinity between the user and other subjects appearing in an image.

The subject faces controls 1114 identify subject faces that may be included or excluded using the subject face selection control 1116. The subjects faces shown may be derived from faces appearing in images in the users collection, social network friends and images, contact list, buddy list, or any combination thereof.

The present disclosure describes methods for identifying images that may be images-of-interest. To accomplish this, the server device 60 searches one or more images sources to identify the images-of-interest. The image sources may be specified by source controls 1118. Source control 1118-1 enables the searching of a user's 12 collection. The user image collection may reside on the mobile device 20, image repository 230, or any combination thereof. Source control 1118-2 enables the searching of a user's social network image collection. Any number of social networks may be searched. The server device 60 preferably searches all images available at the social network that have privacy settings enabling the user to access said images. Source control 1118-3 enables the searching of a user's contacts list images. Source control 1118-4 enables the searching of a user's messenger buddy list. Other sources may be searched. Any number of sources may be searched. The server device 60 preferably has access to a large pool of images, some belonging to the user, some belonging to others. This allows the server device 60 to identify images that the user has not previously encountered. While not shown, preferred embodiments would include support for listing, searching, sorting, and pagination controls for managing subject face preferences.

FIG. 11C graphically illustrates an exemplary user interface 1120 for specifying geographical location preferences on a mobile device 20. The location preferences dialog window 1120 includes a title 1122, a map area 1123 to display a geographical area, and a location selection shape 1122 for specifying a specific location area on the map. The location preferences dialog window may be used to specify positive or negative biases to the area. For example, the location preferences dialog window 1120 may be used to specify areas that will affect the weights of the Location Exclusion Bias (LEB) 1221 values and the image exclusion bias (IEB) 1354 values. A similar user interface may be used by advertisers associated with advertiser devices 90 to specify geographic areas that will control the values for location promotion bias (LPB) 1222 and image promotion bias (IPB) 1355. A slider control 1124 operates to enable a user 12 of the mobile device 20 to control the bias assigned to a selected area 1122 by moving the "thumb" 1127 of the control. The value may be positive 1126 or negative 1125. While not shown, preferred embodiments would include support for listing, searching, sorting, and pagination controls for managing multiple location preferences. Preferred embodiments would include controls for allowing the user to select from existing shapes, including a circle (shown), square etc, or free draw arbitrary closed polygons.

FIG. 11D graphically illustrates an exemplary user interface 1130 for specifying time period preferences on a mobile device 20. The time period preferences dialog window 1130 includes a title 1142, and controls for specifying the time period including a title 1134, start time 1136, end time 1138, and repeat indicator 1139. A slider control 1133 operates to enable a user 12 of the mobile device 20 to control the bias assigned to a selected time period 1132 by moving the "thumb" 1136 of the control. The value may be positive 1135 or negative 1134. Note that the time period preferences are not used in the exemplary computations shown in FIGS. 12B and 13D. However, they may be used in some embodiments to further control the biases as described in the description of FIG. 11C above. While not shown, preferred embodiments would include support for listing, searching, sorting, and pagination controls for managing multiple time period preferences. In some embodiments, the time period preferences may be linked to the user's calendar and inferred from existing entries.

FIG. 11E graphically illustrates an exemplary user interface 1140 specifying notification preferences on a mobile device. The notification preferences dialog window 1140 includes a title 1142 and controls for setting the preferences. The user 12 of the mobile device 20 may elect to receive or block notifications based on criteria including arriving at a new location of interest 1143, encountering a new image of interest 1144, suppressing notifications while driving 1145, suppressing notification at home 1146, and suppressing notifications at work 1147. Notifications may be provided by the mobile device using one or more mechanism including e-mail, text, native phone notification services, etc.

FIG. 11F graphically illustrates an exemplary user interface 1150 specifying notification preferences on a mobile device. The notification preferences dialog window 1150 includes a title 1152 and controls for adjusting location-ofinterest and image-of-interest thresholds. A slider control 1153 operates to enable a user 12 of the mobile device 20 to control the Location Threshold Value (LTV) 1225 by moving the "thumb" 1156 of the control between lower values 1155 and higher values 1152. A slider control 1157 operates to enable a user 12 of the mobile device 20 to control the Image Threshold Value (ITV) 1358 by moving the "thumb" 1158 of the control between lower values 1157 and higher values 1156.

FIG. 11G illustrates an exemplary user interface 1160 for a notification dialog on a mobile device 20. The notification dialog window 1160 includes a title 1162 and a display area for presenting notifications. A first notification 1164 resulting from the detection of a Location-of-Interest (LOI) 1226 is presented. In some embodiments, the user may invoke the first notification to "SEARCH FOR IMAGES". A second notification 1166 resulting from the detection of one or more Images-Of-Interest (IOI) 1359 is presented. In some embodiments, the user may invoke the second notification to "VIEW IMAGES". In some embodiments, a display such as map showing the images-of-interest of FIG. 11H is presented in response.

FIG. 11H illustrates an exemplary user interface 1170 for an images-of-interest map 1170 on a mobile device 20. The images-of-interest map 1170 includes a title 1172 and a display area 1171 for presenting the map. Four images-of-interest are shown 1480-[3,5,8,10]. These images of interested were determined from the computation illustrated in FIG. 13D.

Determining Locations-of-Interest

As used herein, a location-of-interest is a geographical location that the system predicts is of interest to a user 12 for the purpose of identifying images that may have been captured in proximity to the location-of-interest for presentation to the user.

FIG. 12A lists a table 1200 thirty-four geographic locations 1202-[1:34] used in an exemplary calculation to determine locations-of-interest. One of the thirty-four locations, Chapel Hill, is the home location 1202-3. As used herein, a home location is a location at which the user most often resides over a period of time. A home location may be specified by GPS coordinates as a point. In some embodiments, it is specified as an address that is converted to GPS coordinates. In some embodiments, it is auto determined by the system using location tracking history of the user. In some embodiments, the home location is specified by a shape. The shape may be a circle, square, rectangle, or any arbitrary shape.

FIG. 12B graphically illustrates an exemplary computation 1210 for determining if a geographical location is a Location-of-Interest (LOI) 1226. A geographical location is determined to be a Location-of-Interest (LOI) 1226 based on a score that is calculated for the geographical location, such as the Location Affinity Final Score (LAFS) 1224. The Location Affinity Final Score (LAFS) 1224 is based on a number of factors including a time (T) since a user 12 has visited the geographical location, the distance (D) from the geographical location relative to a user's home location 1202-3, and the number of times (N) the user 12 has visited the location. It should be noted that a location is deemed to have been visited when a user comes within a threshold distance to the location. For example, a user is deemed to have visited to Manhattan 1206-34 if they visit any part of Manhattan 1206-34. In some embodiments, this may be implemented as coming with a threshold distance to the location. For example, if a user comes within a mile of a location, it may be deemed to have visited the location. This threshold may be a user and/or system defined setting.

The distance (D) between two points on the earth's surface may be approximated based on the Haversine formula shown in Equation 1 below.

$$\text{Distance}(D) = 2R \ \text{ARCSIN}\left(\text{SIN}^2\left(\frac{LAT2-LAT1}{2}\right) + \text{COS}(LAT1)*\text{COS}(LAT2)*\text{SIN}^2\left(\frac{LON2-LON1}{2}\right)\right) \quad \text{Equation (1)}$$

A formula for computing location affinity is shown is Equation 2. This location affinity is compared to a threshold to determine if a location is a location-of-interest.

$$LA_{LOCATION\ AFFINITY\ THEORETICAL} = \frac{(T_{TIME\ SINCE\ LAST\ VISIT} * D_{DISTANCE\ FROM\ HOME})}{N_{TOTAL\ NUMBER\ OF\ VISITS}} \quad \text{Equation (2)}$$

As can be seen from this formula, a geographical location is more likely to be a location-of-interest if it has been a long time since the user 12 has visited the location (time since last visit is a large number), the location is a long way from where the user lives (distance from home is a large number), and/or the user 12 has never been to the geographical location before (total number of visits is zero). In this scenario the score will be a high number, infinite in fact, given that the denominator is zero.

Conversely, a neighborhood park that was visited yesterday (time since last visit is a small number), is close to the user's home 1242 (distance from home is a small number) and has been visited frequently in the past (total number of visits is a large number) will produce a comparatively low score.

Modifications are made to Equation 2 to produce Equation 3. For example, the time since last visit is clipped at 10 years, the distance from the user's home location is quantized into bands, and one is added to the number of visits to prevent a divide by zero error. Sample results for this computation using Equation 3 are shown in FIG. 12A.

$$ILAS_{INTERMEDIATE\ LOCATION\ AFFINITY\ SCORE} = \frac{(CT_{CLIPPED\ TIME} * QD_{QUANTIZED\ DISTANCE})}{\left(\frac{LV_{LOCATION\ VISITS}}{2} + 1\right)} \quad \text{Equation (3)}$$

The results of Equation 3 are added to the Location Exclusion Bias (LEB) 1221 and Location Promotion Bias (LPB) 1222. As shown in Equation 4.

$$LAS_{LOCATION\ AFFINITY\ SCORE} = ILAS_{INTERMEDIATE\ LOCATION\ AFFINITY\ SCORE} + LEB_{EXCLUSION\ BIAS} + LPB_{PROMOTIONAL\ BIAS} \quad \text{Equation (4)}$$

The result of Equation 4 is used as an input to Equation 5 to introduce non-linearity to the system and to limit the result to between zero and 1. The result of Equation 5 is then compared to a Location Threshold Value (LTV) 1225 to determine if the location is Location-of-Interest (LOI) 1226.

$$FLAS_{FINAL\ LOCATION\ AFFINITY\ SCORE} = \quad \text{Equation (5)}$$

$$S_{SIGMOID}(LAS) = \frac{e^{LAS}}{1+e^{LAS}}$$

The highest scoring location in FIG. 12A is Eugene Oreg., a location that the user 12 has never visited and is a long distance from the user's home 1242 (outside Chapel Hill, N.C.). Not surprisingly, the location that scores the lowest is the town center of Chapel Hill, which is a short distance comparatively from the user's home and has been visit recently and often.

The table below shows the various inputs, intermediate results, and final result for computing a location affinity score.

TABLE 1

FACTORS FOR DETERMINING LOCATION AFFINITY

| FIELD | DESCRIPTION |
|---|---|
| Location City (LC) 1211 | The city as shown in FIG. 12A. |
| Location State (LS) 1212 | The state as shown in FIG. 12A. |
| Location Longitude GPS Coordinate (LLGPSC) 1213 | The longitude GPS coordinate of the city 1211. |
| Location Latitude GPS Coordinate (LLGPSC) 1214 | The latitude GPS coordinate of the city 1211. |
| Distance (D) 1215 | The geographical distance in miles between the "home" location of Chapel Hill and the city as computed using the haversine formula as shown in Equation 1. |
| Quantized Distance from Home (QDH) 1216 | The quantized distance value is determined based on the quantization table shown below. The distance is the distance between the user's home location and the location being tested as a location-of-interest (the user's current location). |

| LOWER BOUND | UPPER BOUND | QD |
|---|---|---|
| 0 | <31.25 | 0 |
| >=31.25 | <62.5 | 1 |
| >=62.5 | <125 | 2 |
| >=125 | <250 | 3 |
| >=250 | <500 | 4 |
| >=500 | <1000 | 5 |
| >=1000 | <2000 | 6 |
| >=2000+ | | 7 |

| FIELD | DESCRIPTION |
|---|---|
| Time (T) 1217 | The time, in days, since the last time the user visited the location. |
| Clipped Time (CT) 1218 | The clipped time is equal to the time (T) clipped to a maximum value of 3650 days (~10 years), divided by that same maximum value of 3650 days (~10 years). |
| Location Visits (LV) 1219 | Location Visits (LV) 1219 is equal to the total number of life time visits to the location. More than one visit in a day is truncated to a single visit. |
| Intermediate Location Affinity Score (ILAS) 1220 | As calculated from Equation 3. |
| Location Exclusion Bias (LEB) 1221 | The exclusion bias is used to dampen or attenuate a geographical area according to an Location Exclusion Bias (LEB) 1221. The Location Exclusion Bias (LEB) 1221 differs from the Location Promotion Bias (LPB) 1222 in that an advertiser provides remuneration in exchange for application of a Location Promotion Bias (LPB) 1222, while the Location Exclusion Bias (LEB) 1221 is applied according to user preference. The Location Exclusion Bias (LEB) 1221 is determined based on the user's current location. The Location Exclusion Bias (LEB) 1221 typically has a negative value, but may have both positive and negative values in some embodiments. |
| Location Promotion Bias (LPB) 1222 | The Location Promotion Bias (LPB) 1222 is applied in exchange for remuneration received from an advertiser. The Location Promotion Bias (LPB) 1222 is determined based on the user's current location. The Location Promotion Bias (LEB) 1222 typically has a positive value, but may have both positive and negative values in some embodiments. |
| Location Affinity Score (LAS) 1223 | Is equal to the addition of Intermediate Score (IS) 1220, Location Exclusion Bias (LEB) 1221, and promotion bias (PW) 1222 as shown in Equation 4 |
| Location Affinity Final Score (LAFS) 1224 | Is calculated from Equation 8 using the Location Affinity Score (LAS) 1223 as input. |

TABLE 1-continued

FACTORS FOR DETERMINING LOCATION AFFINITY

| FIELD | DESCRIPTION |
|---|---|
| Location Threshold Value (LTV) 1225 | The Location Affinity Final Score (LAFS) 1224 may be compared to a Location Threshold Value (LT) 1225 to determine if a location is a Location-of-Interest (LOI) 1226. Because of the nature of Equation 7, it will always return a value between zero and 1. The Location Threshold Value (LT) 1225 may be user designated, system designated, and/or adapted/modified over time based on a user's interactions with the system. In some embodiments, Location Threshold Value (LT) 1225 may be any value greater than zero and less than equal to 1. In some embodiments, values including .1, .2, .3, .4, .5, .6, .7 .8, .9 may be used. |
| Location-of-Interest (LOI) 1226 | A Boolean indicating whether the location is a Location-of-Interest (LOI) 1226. |

Determining Images-of-Interest

As used herein, an image-of-interest is an image that the system predicts is of interest to a user for the purpose of providing notifications to the user identifying the location at which the image was captured.

Determining if an image is an image-of-interest involves first determining an image affinity score and comparing it to a threshold. The image affinity score may be derived from zero or more subject affinity scores. The subject affinity scores are based on determining subjects appearing in an image, determining the relationships between the user and the subject, and adding the zero or more subject affinity scores together to determine the image affinity score.

Determining Subject Affinity

FIG. 13A is a graphical illustration 1300 an exemplary image. The image corresponds to image 8 (1402-8) and contains three subject faces S2, S3, S4.

FIG. 13B is a graphical illustration 1302 of the image of FIG. 13A in an exemplary page from a social network showing activities related to an image that is used in computing subject affinity. The social network user account belongs to subject S1. Subject S2 has uploaded 1303 the image 1402-8, and subjects S1-S4 have commented 1304 on the image 1402-8. Subject S1 has liked 1306 the photo. Subject S2 has disliked 1308 the photo.

FIG. 13C is a graphical illustration 1320 of an exemplary computation for determining a single image affinity score. In computing an image affinity, a subject affinity must first be determined first. As used herein, subject affinity refers to a strength of relationship between the viewer and another subject. The subject affinity is derived from the identity of the other subject and not the appearance or physical attributes of the other user. As used herein, subject refers to a person who appears in an image. As used herein, subject face refers to the face of the subject appearing in the image. Equation 6 shown below is used in determining subject affinity.

Table 2 describes various sources that may be used to determine subject affinity between a user and each of one or more subjects. The values in the [ASW] matrix are determined according to Table 2. In the computation example shown in FIG. 13C, the values for [ASW] are set to "1" for the sake of simplicity. As used herein, an affinity source refers to a source that may be used to infer affinity between a user and each of one or more subjects. Those affinity sources may include Subject Face Occurs in Images in User's Collection, Subject Face Occurs in Images with Viewer, Subject is Symmetric Social Friend, Subject is Asymmetric Social Friend, Subject is Contact, and Subject is Explicitly Specified.

TABLE 2

SUBJECT AFFINITY SOURCES USED IN DETERMINING SUBJECT AFFINITY

| AFFINITY SOURCE | SYMBOL | DESCRIPTION |
|---|---|---|
| Subject Face Occurs in Images in User's Collection | SF | Subject affinity between viewer and another subject is inferred by the number of times the other user appears in an image associated with the viewer. |
| Subject Face Occurs in Images with Viewer | CO | Subject affinity between viewer and another subject is inferred by the number of instances where the viewer and the other subject occur in the same image. |
| Subject is Symmetric Social Friend | SSF | Subject affinity between viewer and another subject is inferred by the social distance between the viewer and the other subject in a social graph. The subject affinity between the viewer and the other subject is symmetric and the two users are "friends". |
| Subject is Asymmetric Social Friend | ASF | Subject affinity between viewer and another subject is inferred by the social distance between the viewer and the other subject being followed. The subject affinity between the viewer and the other subject is asymmetric as the viewer is "following" the other subject. |

TABLE 2-continued

SUBJECT AFFINITY SOURCES USED IN DETERMINING SUBJECT AFFINITY

| AFFINITY SOURCE | SYMBOL | DESCRIPTION |
|---|---|---|
| Subject is Contact | CL | Subject affinity between viewer and another subject is inferred from the other subject appearing in a contact list associated with the user |
| Subject is Explicitly Specified | EX | Subject affinity between viewer and another subject is explicitly specified by the viewer |

Table 3 describes various subject actions that may be used to determine subject affinity between a viewer and each of one or more subjects. The values in the [AW] matrix are determined according to Table 3. In the computation example shown in FIG. 13C, the values for [AW] are set to "1" for the sake of simplicity. As used herein, a subject action refers to an action taken in association with an image by a subject. Those actions may include capturing the image, uploading or posting the image, appearing in the image, commenting on the image (including tags and annotations), and liking or disliking an image.

TABLE 3

SUBJECT ACTIONS FOR DETERMINING SUBJECT AFFINITY

| ACTION | SYMBOL | DESCRIPTION |
|---|---|---|
| Take image | T | Subject took the image |
| Upload image | U | Subject uploaded and/or posted the image |
| Appear in image | A | Subject appears in the image |
| Comment on image | C | Subject commented on the image. As used herein, a comment can mean an annotation or tag. |
| Like/Dislike | LD | Subject indicated they liked or disliked an image |

Subject Affinity 1343 [SA] is determined using Equation 6. Equation 6 involves a matrix multiplication of four matrices. The first matrix, [ASW] 1322, is of dimension [1 1330]×[number of affinity sources weightings 1323]. The affinity sources weightings may be chosen empirically, and adjusted based on feedback received from the viewer (FIG. 10). The second matrix, [AO] 1324, is of dimension [affinity sources weightings 1332×affinity occurrences 1325]. The values of [AO] are determined by analyzing a viewer's data and determining values for Table 2 below. The third matrix, [SA] 1326, is of dimension [subjects 1334×subject actions 1327]. The values for [SA] are determined by analyzing subject actions in relation to a particular image. Subject actions are described in Table 2. Finally, the fourth matrix, [AW] 1328, is of dimension [subject actions 1336×subject action weightings 1329]. The subject action weightings may be chosen empirically and adjusted based on feedback received from the viewer (FIG. 10). In the computation example shown in FIG. 13C, the dimensions are [1×6][6× 4][4×5][5×1]=[1×1] 1343.

The multiplication of [ASW][AO] produces the weighted affinity occurrences [WOA] matrix 1337. The multiplication of [SA][AW] produces the weighted actions [WA] matrix 1339. The multiplication of [WOA][WA] produces the subject affinity score [SA] 1343.

$$S_{AFFINITY} = [ASW][AO][SA][AW] \quad \text{Equation (6)}$$

Finally, the subject affinity result 1343 is divided by the distance of the viewer to the capture location of the image. Note that the distance being used in this computation is the distance between the current location of the user as they are traveling and the capture location of the image, and not the home location of the user that was used in Equations 2 and 3.

$$IIAS_{INTERMEDIATE\ IMAGE\ AFFINITY\ SCORE} = \frac{SA_{SUBJECT\ AFFINITY}}{ID_{IMAGE\ DISTANCE}} \quad \text{Equation (7)}$$

$$IAS_{IMAGE\ AFFINITY\ SCORE} = \quad \text{Equation (8)}$$
$$IIAS_{INTERMEDIATE\ IMAGE\ AFFINITY\ SCORE} + IEB_{IMAGE\ EXCLUSION\ BIAS} + IPB_{IMAGE\ PROMOTIONAL\ BIAS}$$

$$FIAS_{FINAL\ IMAGE\ AFFINITY\ SCORE} = S_{SIGMOID}(IAS) = \frac{e^{IAS}}{1 + e^{IAS}} \quad \text{Equation (9)}$$

FIG. 13D is a graphical illustration 1350 an exemplary computation for determining images-of-interest.

TABLE 4

FACTORS FOR DETERMINING IMAGE AFFINITY

| FIELD | DESCRIPTION |
|---|---|
| Location 1351 | The current location of the user 12 |
| Image Latitude GPS coordinate 1352 | The latitude GPS coordinate of the Location 1351 |
| Image Longitude GPS coordinate 1353 | The longitude GPS coordinate of the Location 1351 |
| Image Distance (ID) 1354 | The distance between the image capture location and the current location of the user. |
| Subject Affinity (SF) 1355 | The image Affinity 1355 as determined from Equation 6. |
| Image Exclusion Bias (IEB) 1356 | An exclusion Bias may be applied to the Image Affinity. The Image Exclusion Bias (IEB) 1356 is applied to the geographic location at which the image was captured. The Image Exclusion Bias (IEB) 1356 typically has a negative value, but may have both positive and negative values in some embodiments. |

TABLE 4-continued

FACTORS FOR DETERMINING IMAGE AFFINITY

| FIELD | DESCRIPTION |
| --- | --- |
| Image Promotional Bias (IPB) 1357 | An exclusion Bias may be applied to the Image Affinity. The Image Exclusion Bias (IEB) 1356 is applied to the geographic location at which the image was captured. The Image Promotional Bias (IPB) 1355 typically has a positive value, but may have both positive and negative values in some embodiments. |
| Image Affinity Score (IAS) 1358 | The Image Affinity as determined in Equation 7. |
| Final Image Affinity Score (FIAS) 1359 | Is calculated from Equation 9 using the Image Affinity Score (IAS) 1358 as input. |
| Image Threshold Value (ITV) 1360 | the Final Image Affinity Score (FIAS) 1359 may be compared to an Image Threshold Value (ITH) 1360 to determine if an image is an Image Threshold Value (ITH) 1360. Because of the nature of Equation 7, it will always return a value between zero and 1. The Image Threshold Value (ITH) 1360 may be user designated, system designated, and/or adapted/modified over time based on a user's interactions with the system. In some embodiments, Image Threshold Value (ITH) 1360 may be any value greater than zero and less than equal to 1. In some embodiments, values including .1, .2, .3, .4, .5, .6, .7 .8, .9 may be used. |
| Image-Of-Interest (IOI) 1361 | A Boolean indicating whether an image is an Image-Of-Interest (IOI) 1361 |

In some embodiments, the Location Affinity Score (LAS) 1223 may be combined with the Image Affinity Score (IAS) 1358 to produce a composite score before inputting to Equation 4. Some possible embodiments are shown in equations 9 and 10.

$$CS_{COMPOSITE\ SCORE} = LAS_{LOCATION\ AFFINITY\ SCORE} * IAS_{IMAGE\ AFFINITY\ SCORE} \quad \text{Equation (10)}$$

$$CS_{COMPOSITE\ SCORE} = LAS_{LOCATION\ AFFINITY\ SCORE} + IAS_{IMAGE\ AFFINITY\ SCORE} \quad \text{Equation (11)}$$

$$FCS_{FINAL\ COMPOSITE\ SCORE} = \quad \text{Equation (12)}$$
$$S_{SIGMOID}(CS_{COMPOSITE\ SCORE}) = \frac{e^{CS_{COMPOSITE\ SCORE}}}{1 + e^{CS_{COMPOSITE\ SCORE}}}$$

In some embodiments, the check to determine if a location is a Location-Of-Interest may be skipped entirely.

In some embodiments, neural network techniques may be used to predict locations-of-interest and images-of-interest. However, using neural network techniques requires sufficient training data to train the neural network model. In these embodiments, a first technique, such as the computations shown in Equations 1-12 may be used until such time as sufficient training data has become available for training, at which point, the system may switch over to using neural network prediction models or a hybrid approach using both techniques.

In some embodiments, the user may manually input a target geographic location on a map that is not the current location of the mobile device. In this embodiment, images-of-interest are determined based on that target geographic location without first determining if the location is a location-of-interest. In addition, the Image Distance (ID) 1354 is modified to the distance between the image capture location and the target geographic location for use in Equation 7. Because a current location of a device is not required, any device, including devices lacking the hardware capabilities to determine their locations, may be used. For example, desktop personal computers.

In some embodiments, the user may manually input a target geographic area on a map that may or may not include the current location of the mobile device. In this embodiment, images-of-interest are determined based on that target geographic area without first determining if the area includes a location-of-interest. In addition, the Image Distance (ID) 1354 is set to 1 for use in Equation 7. Because a current location of a device is not required, any device, including devices lacking the hardware capabilities to determine their locations, may be used. For example, desktop personal computers.

FIG. 13E is a graphical illustration 1370 of the locations of images being scored overlaid on a map. Location one 1380-1, is the location of the viewer 12. Locations 1380-2: 1380-10 are the respective locations of nine images being evaluated. In this example, the map shows the island of Manhattan. Images 1380-3, 1380-5, 1380-8, and 1380-10, which were determined to be images-of-interest in the example of FIG. 13D are marked with a different pattern on the map.

FIG. 13F is a graphical illustration 1372 of the images being evaluated 1480-2:1480-10 overlaid on the map of Manhattan 1206-34 of FIG. 13E by location. Again, images 1380-3, 1380-5, 1380-8, and 1380-10, which were determined to be images-of-interest in the example of FIG. 13D are marked with a different pattern on the map.

FIG. 13G is a graphical illustration 1374 of a promotional bias areas 1394 overlaid on the map of Manhattan 1206-34 of FIG. 13E. Four promotional bias areas are shown 1394-[1:4]. Note that promotional bias areas may overlap such as areas 1394-3 and 1394-4. The promotional bias areas shown in this figure do not correspond to the values 1355 used in the example of FIG. 13D and are for illustration purposes only.

FIG. 14 is a graphical illustration 1400 of the images 1480-2:1480-8, and elements found therein, for the example shown in FIGS. 13A-13E.

FIG. 15 is a block diagram 1500 illustrating components of a machine 1500, according to some embodiments, able to read instructions from a machine-readable medium 1538

(e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, client, or other executable code) for causing the machine 1500 to perform any one or more of the methodologies discussed herein can be executed. In alternative embodiments, the machine 1500 operates as a standalone device or can be coupled (e.g., networked) to other machines 1500. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), a digital picture frame, a TV, an Internet-of-Things (IoT) device, a camera, other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (CPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 15 shows multiple processors 1510, the machine 1500 may include a single processor 1510 with a single core, a single processor 1510 with multiple cores (e.g., a multi-core processor 1510), multiple processors 1512, 1514 with a single core, multiple processors 1510, 1512 with multiples cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1538 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. Likewise, not all machines will include all I/O components 1550 shown in this exemplary embodiment. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 15 or other device(s) 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine 1500 or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform of Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1580 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1538 is non-transitory (not having any transitory signals) in that it does not embody a propagating signal. However, labeling the machine-readable medium 1538 "non-transitory" should not be construed to mean that the medium is incapable of movement; the medium 1538 should be considered as being transportable from one physical location to another. Additionally, since the machine-readable medium 1538 is tangible, the medium 1538 may be considered to be a machine-readable device.

In the embodiments described herein, the other devices 1570 may include the mobile device 20, server device 60, and advertiser device 90. The network 1580 may include the network 15.

FIG. 16 is a block diagram 1600 illustrating an exemplary software architecture 1602, which can be employed on any one or more of the machines 1500 described above. FIG. 16 is merely a non-limiting example of a software architecture, and it will be appreciated that many other architectures can be implemented to facilitate the functionality described herein. Other embodiments may include additional elements not shown in FIG. 16 and not all embodiments will include all of the elements of FIG. 16. In various embodiments, the software architecture 1602 is implemented by hardware such as machine 1500 of FIG. 15 that includes processors 1510, memory 1530, and I/O components 1550. In this example architecture, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system 1604 or platform.

According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third-party application 1666 (e.g., an application 1610 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1666 can invoke the API calls 1612 provided by the operating system 1604 to facilitate functionality described herein.

FIG. 17 is a graphical illustration 1700 of the mobile device 20, which is an embodiment of the hardware architecture of FIG. 15 and the software architecture of FIG. 16. Most mobile devices 20, for example high end cell phones, will contain most or all of the element described in FIG. 15.

FIG. 17 is a graphical illustration 1700 of the mobile device 20, which is an embodiment of the hardware architecture of FIG. 15 and the software architecture of FIG. 16. Most mobile devices 20, modern cellular phones for example, will contain most or all the element described in FIGS. 15 & 16.

Referring now to FIG. 17, the mobile device 20 includes a controller 1704 communicatively connected to memory 1706, one or more communications interfaces 1708, one or more user interface components 1710, and one or more storage devices 1712, and location components 1714 by a bus 1702 or similar mechanism. The controller 1704 may be, for example a microprocessor, digital ASIC, FPGA, or the like. In the embodiment of FIG. 17, the controller 1704 is a microprocessor, and the client module 23, configuration module 24, triggering module 26, notification module 28, affinity prediction module 30, UI module 32, 3D engine module 34, AR renderer module 36, navigation module 38, imaging module 40, facial detection module 42, facial matching module 44, and facial identification module 46 are implemented in software and stored in the memory 1706 for execution by the controller 1704. However, the present disclosure is not limited thereto. The aforementioned functions and module may be implemented in software, hardware, or a combination thereof. Further, the repositories 80-1 may be stored in the one or more secondary storage components 1712. The mobile device 20 also includes a communication interface 1708 enabling the mobile device 20 to connect to the network 15. For example, the communications interface 1708 may be a local wireless interface such as a wireless interface operating according to one of the suite of IEEE 802.11 standards, BLUETOOTH®, or the like. However, the present disclosure is not limited thereto. The one or more user interface components 1710 include, for example, a touchscreen, a display, one or more user input components (e.g., a keypad), a speaker, or the like, or any combination thereof. The storage component(s) 1712 is a non-volatile memory. In this embodiment, the location component 1714 is a hardware component, such as a GPS receiver. However, the present invention is not limited thereto.

FIG. 18 is a graphical illustration 1800 of the server device 60. The server device 60 is also an instance the hardware architecture of FIG. 15 and the software architecture of FIG. 16, however in most embodiments the server device 60 will be a stripped-down implementation of the machine 1500. For example, a server device 60 may be a rack mount server and/or a blade server and may lack many of the sensors and I/O components shown FIG. 15. Server devices 60 are often optimized for speed, throughput, power consumption, and reliability.

Referring to FIG. 18, the server device 60 includes a controller 1804 communicatively connected to memory 1806, one or more communications interfaces 1808, and one or more storage devices 1812 by a bus 1802 or similar mechanism. The controller 1804 may be, for example a microprocessor, digital ASIC, FPGA, or the like. In this embodiment, the controller 1804 is a microprocessor, and the account module 64, imaging module 66, map module 68, and communication module 70 are implemented in software and stored in the memory 1806 for execution by the controller 1804. However, the present disclosure is not limited thereto. The aforementioned module may be implemented in software, hardware, or a combination thereof. The server device 60 also includes a communication interface 1808 enabling the server device 20 to connect to the network 15. For example, the communications interface 1808 may be a wired interface such as an Ethernet interface. However, the present disclosure is not limited thereto. The account repository 200, image repository 230, map repository 250, communications queue repository 260, tracking data repository 270 and promotions repository 280 may be stored in the one or more secondary storage components 1812. The secondary storage components 1812 may be digital data storage components such as, for example, one or more hard disk drives. However, the present invention is not limited thereto.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Throughout this specification, like reference numbers signify the same elements throughout the description of the figures.

When elements are referred to as being "connected" or "coupled", the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media is non-transitory and includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage components, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The methodologies presented herein are described around the use of still image capture, but they are not restricted thereto. The same principles may be applied to the presentation of video clips captured at a location and should be considered within the scope of the present application.

Those skilled in the art will recognize improvements and modifications to the embodiments of the present disclosure. All such improvements and modifications are considered within the scope of the concepts disclosed herein and the claims that follow.

What is claimed is:

1. A method of operating a mobile device comprising:
    sending, to a server device, a current geographical location of the mobile device; and
    receiving, from the server device, information identifying an image-of-interest, the image-of-interest captured in geographical proximity to a location-of-interest and identified based on a user profile of a user account associated with the mobile device, the location-of-interest identified based on a location affinity score, the user profile determined based on analyzing a plurality of images and social graph information, both associated with the user account, to determine subject affinities between a user of the mobile device and other users of other mobile devices.

2. The method of claim 1, the image-of-interest identified in response to identification of the current geographical location of the mobile device as the location-of-interest.

3. The method of claim 1, in building the user profile of the user account of the user of the mobile device, the user profile including the subject affinities, the server device having:
    retrieved the plurality of images from an image collection linked to the user account; and
    retrieved the social graph information for the user account.

4. The method of claim 3, in determining the subject affinities of the user profile, the server device having:
    analyzed symmetric social network connections between the user and ones of the other users;
    analyzed asymmetric social network connections between the user and the ones of the other users;
    analyzed occurrences of subject faces of a plurality of other users appearing in the plurality of images in the image collection; and
    analyzed co-occurrences of a subject face of the user of the mobile device and other subject faces of the plurality of other users of the other mobile devices occurring in the plurality of images in the image collection.

5. The method of claim 1, in having built the user profile of the user account of the user of the mobile device, the user profile including a geographical location history, the server device having:
    collected geographical location data for the mobile device on a periodic basis;
    stored the geographical location data in a tracking database; and
    determined a home location using the geographical location data.

6. The method of claim 1, in having determined the location affinity score, the server device having made a determination based on:
    a distance between the current geographical location and a home geographical location;
    a number of days since the current geographical location was visited;
    a total number of times that the current geographical location was visited; and
    the location affinity score based on the distance between the current geographical location and the home geographical location, the number of days since the current geographical location was visited, and the total number of times that the current geographical location was visited.

7. The method of claim 6, in having determined if the current geographical location of a first device represents the location-of-interest, the server device having computed the location affinity score to be proportional to the distance between the current geographical location and the home geographical location a last time that the current geographical location was visited and inversely proportional to the total number of times that the current geographical location was visited.

8. The method of claim 6, in having determined the location affinity score, the server device having:
    modified the location affinity score based on an exclusion bias applied to the current geographical location, wherein the exclusion bias is determined from taking a sum of one or more geographical shapes in which the current geographical location falls, each shape derived from the user profile of the user; and
    modified the location affinity score based on a promotional bias applied to the current geographical location, wherein the promotional bias is determined from taking the sum of the one or more geographical shapes in which the current geographical location falls, each of the one or more geographical shapes specified by an advertiser and assigned a value based on a remuneration received from the advertiser.

9. The method of claim 6, in having identified one or more images-of-interest in geographical proximity to the location-of-interest, the server device having:
performed a comparison of the location affinity score to a location threshold value; and
based on the comparison, determined that an image is the image-of-interest.

10. The method of claim 1, in having identified one or more images-of-interest in the geographical proximity to the location-of-interest, the server device having:
designated a search area based on the location-of-interest; and
identified an image as having been captured within the search area surrounding the location-of-interest as the image-of-interest.

11. The method of claim 10, a size of the search area having been designated based on a speed of travel of the mobile device as measured over a time interval.

12. The method of claim 10, a shape of the search area having been designated based on a direction of travel of the mobile device as measured over a time interval.

13. The method of claim 10, a size of the search area having been designated based on an altitude of travel of the mobile device as measured over a time interval.

14. The method of claim 1, in having determined if an image represents the image-of-interest, the server device having:
determined an image affinity score; and
based on the image affinity score, determined if the image is the image-of-interest.

15. The method of claim 14, in determining the image affinity score, the server device having:
determined subjects associated with the image by identifying:
a first other user having captured the image;
one or more second other users appearing as subject faces in the image; and
one or more third other users contributing comments to the image; and
determined action weights by:
designating a first action weight for the one or more second other users appearing as subject faces in the image;
designating a second action weight for the one or more third other users contributing comments to the image; and
designating a third action weight for the one or more third other users contributing comments to the image; and
computed the image affinity score by:
determining a first partial score based on a first subject affinity of the first other user and the first action weight;
determining a second partial score based on second subject affinities of the one or more second other users and the second action weight;
determining a third partial score based on third subject affinities of the one or more third other users and the third action weight; and
determining the image affinity score based on the first partial score, the second partial score, and the third partial score.

16. The method of claim 15, the server device having scaled the subject affinities of the one or more second other users appearing as the subject faces in the image based on a size of a subject face in relation to dimensions of the image and a location of the subject face within the image.

17. The method of claim 15, the server device having:
determined a distance between the current geographical location and a capture location of the image; and
modified the image affinity score based on the distance.

18. The method of claim 15, in having determined the image affinity score, the server device having:
modified the image affinity score based on an exclusion bias applied to a geographical capture location of the image, wherein the exclusion bias is determined from taking a sum of one or more geographical shapes in which the geographical capture location of the image falls, each of the one or more geographical shapes derived from the user profile of the user; and
modified the image affinity score based on a promotional bias applied to the geographical capture location of the image, wherein the promotional bias is determined from taking the sum of a second one or more geographical shapes in which the geographical capture location of the image falls, each of the second one or more geographical shapes specified by an advertiser and assigned a value based on a remuneration received from the advertiser.

19. The method of claim 15, in having determined the image affinity score, the server device having:
computed the image affinity score for the image to be:
proportional to the first partial score, the second partial score, and the third partial score; and
inversely proportional to a distance between the current geographical location and a geographical capture location.

20. The method of claim 15, in having determined if the image represents the image-of-interest, the server device having:
performed a comparison of the image affinity score to an image threshold value; and
based on the comparison, determined that the image is the image-of-interest.

21. The method of claim 1, in having sent the information identifying the image-of-interest, the server device having:
received, from the mobile device, second information identifying user interactions with the image-of-interest at the mobile device; and
adjusted parameter weights of subject affinity sources and subject actions based on the second information identifying the user interactions.

22. The method of claim 21, in having sent the information identifying the image-of-interest, the server device having:
sent promotional information associated with an image to the mobile device, the promotional information including one or more adornments configured for presentation with the image.

23. The method of claim 21, in having sent the information identifying the image-of-interest, the server device having:
received, from the mobile device, user interaction feedback, the user interaction feedback including:
time difference between the mobile device of the user receiving a notification identifying an image,
time spent by the mobile device of the user interacting with the image,
comments added using the mobile device of the user,
likes applied using the mobile device of the user, and
dislikes applied using the mobile device of the user.

24. The method of claim 23, the server device having:
received, from a plurality of other mobile devices associated with other user accounts of other users of the other mobile devices, a plurality of other images; and
identified, from the plurality of other images, the image-of-interest.

25. The method of claim 1 wherein the image-of-interest is one of one or more images-of-interest and the location-of-interest is one of one or more locations-of-interest.

26. A mobile device comprising:
a communication interface operable to:
couple the mobile device to a server device; and
a processor and memory associated with the communication interface and operable to:
send, to the server device, a current geographical location of the mobile device; and
receive, from the server device, information identifying an image-of-interest, the image-of-interest being an image captured in geographical proximity to a location-of-interest and identified based on a user profile of a user account associated with the mobile device, the location-of-interest identified based on a location affinity score, the user profile determined based on analyzing a plurality of images and social graph information, both associated with the user account, to determine subject affinities between a user of the mobile device and other users of other mobile devices.

27. A non-transitory computer readable medium storing program code that when executed by a processor of a mobile device render the mobile device operable to:
send, to a server device, a current geographical location of the mobile device; and
receive, from the server device, information identifying an image-of-interest, the image-of-interest being an image captured in geographical proximity to a location-of-interest and identified based on a user profile of a user account associated with the mobile device, the location-of-interest identified based on a location affinity score, the user profile determined based on analyzing a plurality of images and social graph information, both associated with the user account, to determine subject affinities between a user of the mobile device and other users of other mobile devices.

* * * * *